(12) United States Patent
Lu

(10) Patent No.: US 12,368,388 B2
(45) Date of Patent: Jul. 22, 2025

(54) LAYOUT METHOD FOR POWER SUPPLIES WITH THREE-PHASE INTEGRATED TRANSFORMER AND SYNCHRONOUS RECTIFICATION

(71) Applicant: AA Power Inc., Boston, MA (US)

(72) Inventor: Qun Lu, Lexington, MA (US)

(73) Assignee: AA Power Inc., Boston, MA (US)

( * ) Notice: Subject to any disclaimer, the term of this patent is extended or adjusted under 35 U.S.C. 154(b) by 206 days.

(21) Appl. No.: 18/370,185

(22) Filed: Sep. 19, 2023

(65) Prior Publication Data

US 2024/0106340 A1     Mar. 28, 2024

Related U.S. Application Data

(60) Provisional application No. 63/376,703, filed on Sep. 22, 2022.

(51) Int. Cl.
*H02M 7/00* (2006.01)
*H02M 1/00* (2006.01)
*H02M 7/04* (2006.01)
*H02M 7/217* (2006.01)

(52) U.S. Cl.
CPC ........... *H02M 7/003* (2013.01); *H02M 1/007* (2021.05); *H02M 7/05* (2021.05); *H02M 7/2173* (2013.01)

(58) Field of Classification Search
CPC ........ H02M 7/003; H02M 1/007; H02M 7/05; H02M 7/2173
See application file for complete search history.

(56) References Cited

U.S. PATENT DOCUMENTS

| | | | |
|---|---|---|---|
| 7,145,786 B2 * | 12/2006 | Vinciarelli | H02M 3/33573 363/17 |
| 2020/0220469 A1 * | 7/2020 | Morrison | H02M 3/33553 |
| 2021/0081013 A1 * | 3/2021 | Wang | G06F 1/20 |
| 2024/0313667 A1 * | 9/2024 | Zhao | H02M 3/003 |

* cited by examiner

*Primary Examiner* — Adolf D Berhane
(74) *Attorney, Agent, or Firm* — AP3 Law Firm PLLC

(57) ABSTRACT

An apparatus includes, on a top layer of a circuit board, a first and a second synchronous rectifier groups (SRGs) placed along first two opposite sides of a first phase of a transformer including three phases. A second and a fourth SRGs are placed along the first two opposite sides on a bottom layer of the circuit board. The first and second SRGs are connected between a first terminal of the first phase and a grounding terminal. The third and fourth SRGs are connected between a second terminal of the first phase and the grounding terminal. Two filter capacitor groups are placed along second two opposite sides of the first phase on the top layer. Another two filter capacitor groups are placed along the second two opposite sides on the bottom layer. The four filter capacitor groups are connected to a third terminal of the first phase.

20 Claims, 24 Drawing Sheets

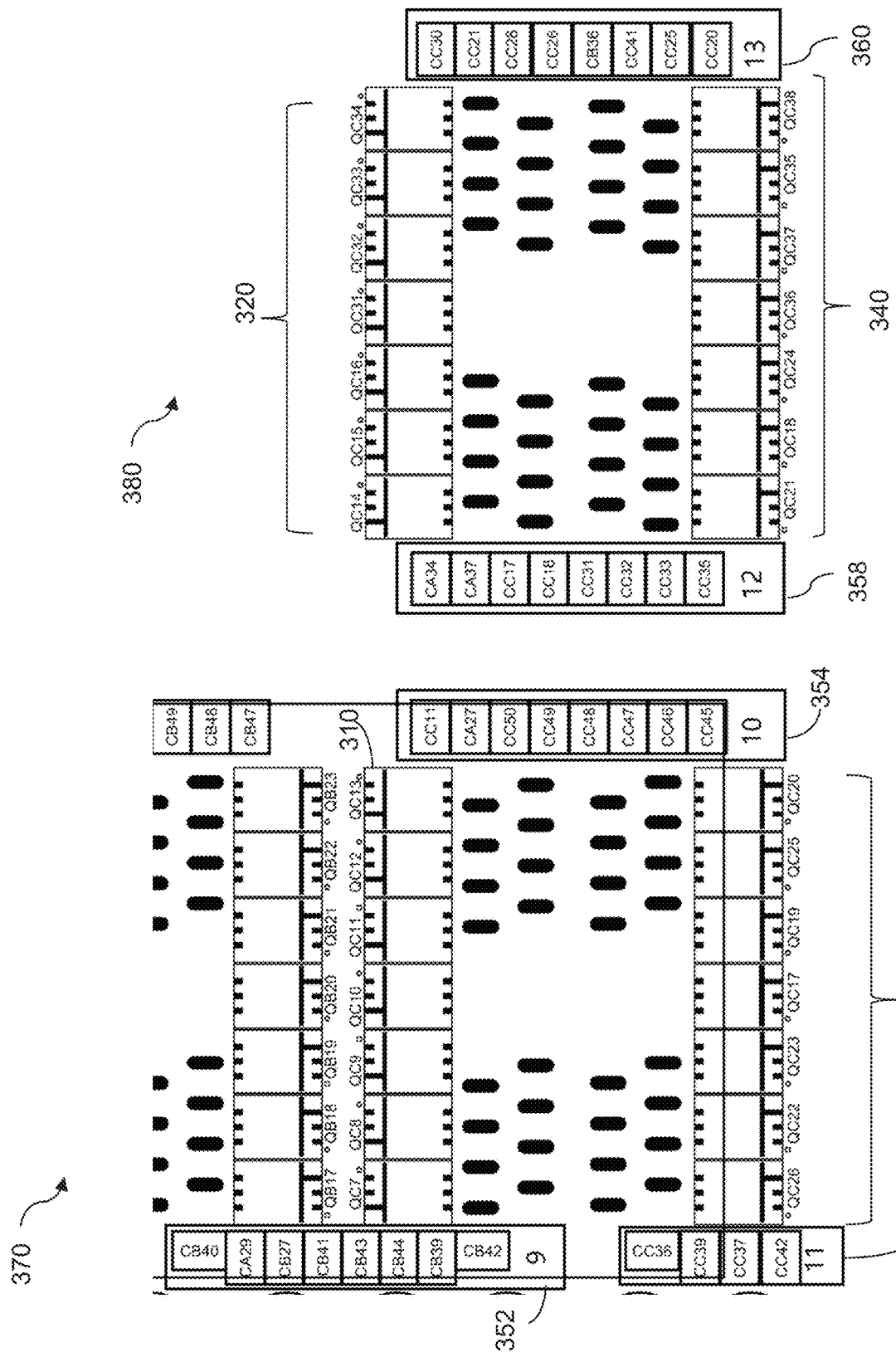

LAYOUT METHOD FOR POWER SUPPLIES WITH THREE-PHASE INTEGRATED TRANSFORMER AND SYNCHRONOUS RECTIFICATION

CROSS-REFERENCE TO RELATED APPLICATIONS

This patent application claims priority to U.S. Provisional Application No. 63/376,703, filed on Sep. 22, 2022 and entitled "Layout Method for Power Supplies with Three-Phase Integrated Transformer and Synchronous Rectification," which is hereby incorporated by reference herein as if reproduced in its entirety.

TECHNICAL FIELD

The present disclosure relates to the field of power supplies, and in particular embodiments, to a layout method for power supplies with three-phase integrated transformer and synchronous rectification.

BACKGROUND

A power conversion system usually includes an AC/DC stage and a DC/DC stage connected in cascade between an AC utility line and a plurality of loads. The AC/DC stage converts the power from the AC utility line to an intermediate DC distribution bus. The DC/DC stage converts the voltage on the intermediate DC distribution bus to a plurality of voltage levels for the plurality of loads. A conventional AC/DC stage may include a variety of electromagnetic interference (EMI) filters, a bridge rectifier formed by four diodes, a power factor correction circuit and an isolated DC/DC power converter. The DC/DC stage may include a plurality of isolated DC/DC converters. Isolated DC/DC converters may be implemented by using different power topologies, such as LLC resonant converters, flyback converters, forward converters, half bridge converters, full bridge converters and the like.

In the power conversion system, a transformer is employed to provide isolation between a primary side and a secondary side of an isolated power converter. In order to increase the power delivered from the primary side to the secondary side, a plurality of transformers may be employed. The plurality of transformers may be integrated into a single device known as an integrated magnetics structure. The use of the integrated magnetic structure improves performance along with a reduction in size and weight.

In the power conversion system, to provide the voltage conversion and regulation functions, power converters include power switches such as metal-oxide semiconductor field-effect transistors (MOSFETs). The power switches form a synchronous rectifier providing a rectification function. When high power conversion efficiency is desired, synchronous rectifiers are employed to replace conventional rectifiers formed by diodes.

SUMMARY

These and other problems are generally solved or circumvented, and technical advantages are generally achieved, by embodiments of the present disclosure which provide a layout method for power supplies with three-phase integrated transformer and synchronous rectification.

In accordance with an aspect of the present disclosure, an apparatus is provided that includes: a transformer on a top layer of a circuit board, the transformer including a first phase transformer; a first synchronous rectifier group and a third synchronous rectifier group placed respectively along first two opposite sides of the first phase transformer on the top layer of the circuit board; a second synchronous rectifier group and a fourth synchronous rectifier group placed respectively along the first two opposite sides of the first phase transformer on a bottom layer of the circuit board, each of the first, second, third and fourth synchronous rectifier groups comprising a plurality of power switches, the first and second synchronous rectifier groups being connected between a first terminal of the first phase transformer and a grounding terminal, and the third and fourth synchronous rectifier groups being connected between a second terminal of the first phase transformer and the grounding terminal; a first output filter capacitor group and a second output filter capacitor group placed respectively along second two opposite sides of the first phase transformer on the top layer of the circuit board; and a third output filter capacitor group and a fourth output filter capacitor group placed respectively along the second two opposite sides of the first phase transformer on the bottom layer of the circuit board, each of the first, second, third and fourth output filter capacitor groups comprising a plurality of capacitors, and being connected between a third terminal of the first phase transformer and sources of power switches of the of the first, second, third and fourth synchronous rectifier groups.

In accordance with another aspect of the present disclosure, a circuit is provided that includes a transformer on a top layer of a circuit board; a first synchronous rectifier group and a third synchronous rectifier group placed respectively along first two opposite sides of the transformer on the top layer of the circuit board; a second synchronous rectifier group and a fourth synchronous rectifier group placed respectively along the first two opposite sides of the transformer on a bottom layer of the circuit board, each of the first, second, third and fourth synchronous rectifier groups comprising a plurality of power switches, the first and second synchronous rectifier groups being connected between a first terminal of the transformer and a grounding terminal, and the third and fourth synchronous rectifier groups being connected between a second terminal of the transformer and the grounding terminal; a first output filter capacitor group and a second output filter capacitor group placed respectively along second two opposite sides of the transformer on the top layer of the circuit board; and a third output filter capacitor group and a fourth output filter capacitor group placed respectively along the second two opposite sides of the transformer on the bottom layer of the circuit board, each of the first, second, third and fourth output filter capacitor groups comprising a plurality of capacitors, and being connected between a third terminal of the transformer and sources of power switches of the of the first, second, third and fourth synchronous rectifier groups.

In accordance with another aspect of the present disclosure, an apparatus is provided that includes: a three-phase integrated transformer on a top layer of a printed circuit board (PCB), the transformer including a first phase transformer, a second phase transformer and a third phase transformer; and for a transformer in the first phase transformer, the second phase transformer and the third phase transformer: a first synchronous rectifier group and a third synchronous rectifier group placed respectively along first two opposite sides of the transformer on the top layer of the PCB; a second synchronous rectifier group and a fourth synchronous rectifier group placed respectively along the first two opposite sides of the transformer on a bottom layer of the PCB, each of the first, second, third and fourth synchronous rectifier groups comprising a plurality of power switches, the plurality of power switches of the first and second synchronous rectifier groups being connected between a first terminal of the transformer and a grounding terminal, and the plurality of power switches of the third and fourth synchronous rectifier groups being connected between a second terminal of the transformer and the grounding terminal; a first output filter capacitor group and a second output filter capacitor group placed respectively along second two opposite sides of the transformer on the top layer of the circuit board; and a third output filter capacitor group and a fourth output filter capacitor group placed respectively along the second two opposite sides of the transformer on the bottom layer of the circuit board, each of the first, second, third and fourth output filter capacitor groups comprising a plurality of capacitors connected between a third terminal of the transformer and sources of power switches of the of the first, second, third and fourth synchronous rectifier groups; and a group of filter capacitors placed along and outside a sidewall of the three-phase integrated transformer on the top layer of the PCB, the group of filter capacitors being connected between the third terminal of the transformer and the grounding terminal.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which:

FIGS. 3C and 3D are schematic diagrams showing an example layout of the third circuit on the PCB in accordance with various embodiments of the present disclosure;

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to embodiments in a specific context, i.e., a layout method for power supplies with three-phase integrated transformer and synchronous rectification. The embodiment layout method can effectively reduce power losses and improve power efficiency. The disclosure may also be applied, however, to a variety of power conversion systems. Hereinafter, various embodiments will be explained in detail with reference to the accompanying drawings.

In some embodiments, a power supply circuit may include a three-phase integrated transformer and associated synchronous rectifiers and output capacitors (or output filter capacitors, filter capacitors). As an example, the three-phase integrated transformer may include a first phase transformer T2A, a second phase transformer T2D, and a third phase transformer T2G, as described in the following. The power supply circuit may be included in a power converter, a power supply apparatus/system or a power conversion apparatus/system.

The synchronous rectifiers may include semiconductor devices, which may also be referred to as synchronous rectifier switches or power switches, which can be controlled more precisely. Synchronous rectifiers allow reduced conduction losses, resulting in improved efficiency and reduced heat generation. Output filter capacitors may serve to filter out unwanted high-frequency noises and ripple voltage from the output of the power supply circuit. Various sized and selected output filter capacitors may be used for meeting voltage regulation standards and preventing voltage spikes that can damage connected equipment.

Figure 1A:
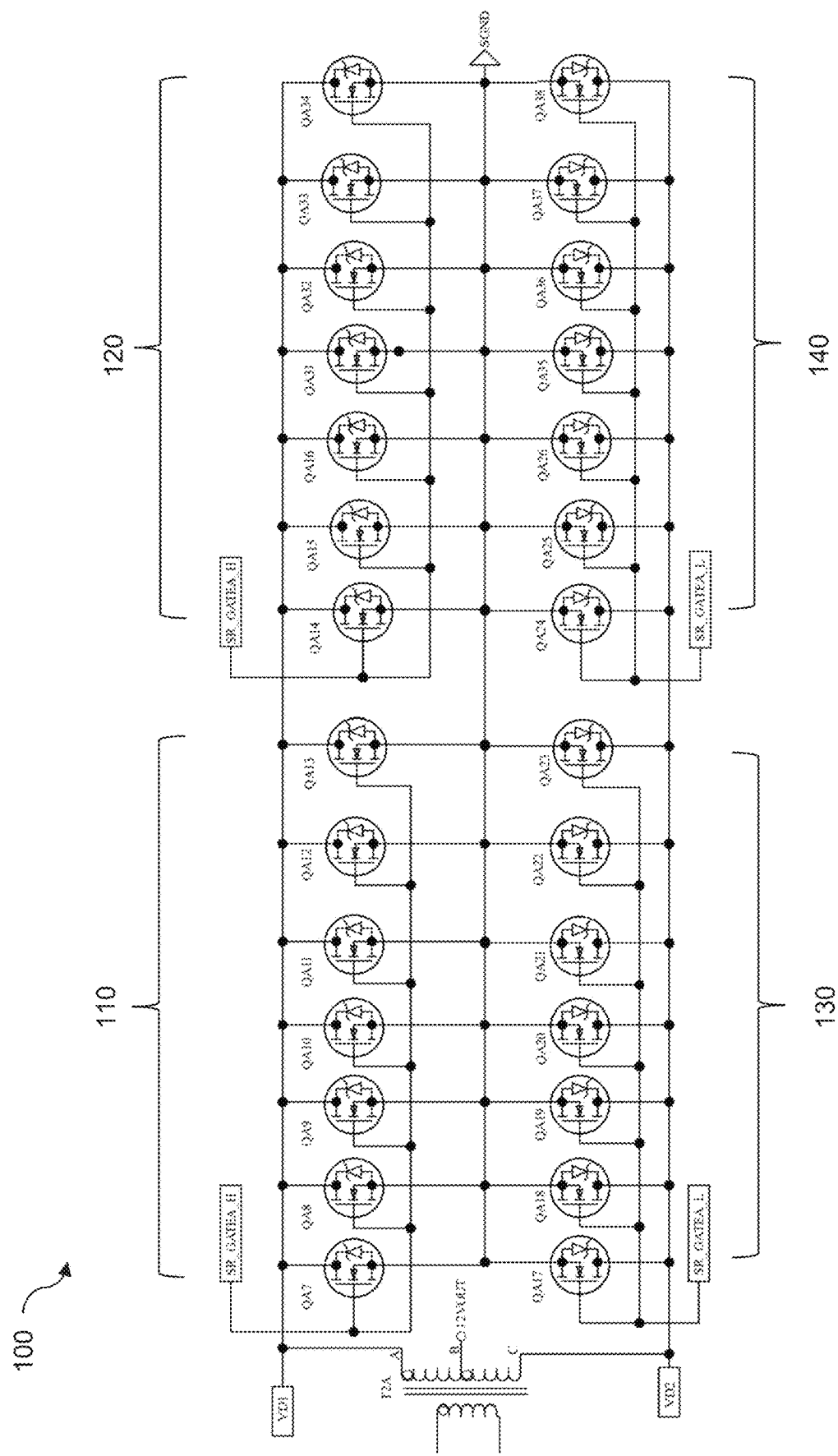
FIG. 1A and FIG. 1B are schematic diagrams showing an example first circuit of a power supply circuit in accordance with various embodiments of the present disclosure.
Figure 1B:
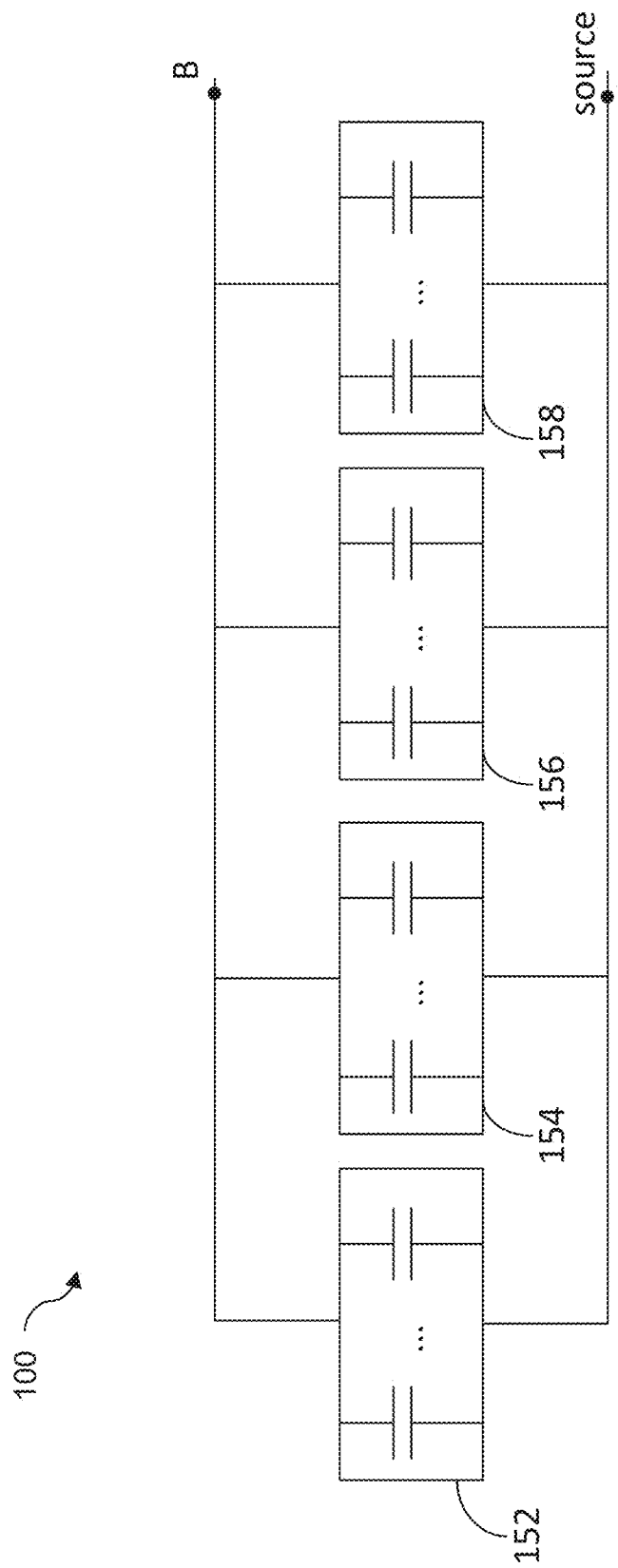

FIG. 1A and FIG. 1B are schematic diagrams showing an example first circuit 100, which is a first part of the power supply circuit, in accordance with various embodiments of the present disclosure. The first circuit 100 includes the first phase transformer T2A of the three-phase integrated transformer and associated synchronous rectifiers and output filter capacitors. The secondary side of the first phase transformer T2A includes three terminals A, B and C. The terminal B is coupled to an output of the power supply circuit (also referred to as a power output), e.g., 12VOUT as shown (generating a 12 V voltage as an example).

In some embodiments, as shown in FIG. 1A, the synchronous rectifiers include four synchronous rectifier groups (SRGs) 110, 120, 130 and 140. The first synchronous rectifier group 110 includes power switches QA7, QA8, QA9, QA10, QA11, QA12, and QA13. The second synchronous rectifier group 120 includes power switches QA14, QA15, QA16, QA31, QA32, QA33, and QA34. The third synchronous rectifier group 130 includes power switches QA17, QA18, QA19, QA20, QA21, QA22, and QA23. The fourth synchronous rectifier group 140 includes power switches QA24, QA25, QA26, QA35, QA36, QA37, and QA38.

The first and second synchronous rectifier groups 110 and 120 are each connected between the terminal A of the first phase transformer T2A and a terminal SGND (or grounding terminal). As an example, as shown in FIG. 1A, each of the power switches in the first and second synchronous rectifier groups 110 and 120 has the drain coupled to the terminal A, and the source coupled to the terminal SGND, with the gate coupled to a gate driving signal (SR_GATEA_H). The third and fourth synchronous rectifier groups 130 and 140 are each connected between the terminal C of the first phase transformer T2A and the terminal SGND. As an example, each of the power switches in the rectifier groups 130 and 140 has the drain coupled to the terminal C, and the source coupled to the terminal SGND, with the gate coupled to a gate driving signal (SR_GATEA_L).

In some embodiments, the output filter capacitors may be divided into four capacitor groups 152, 154, 156 and 158. The first output filter capacitor group 152 includes capacitors CA30, CA23, CA26, and CA22. The second output filter capacitor group 154 includes capacitors CB18, CB30, CA51, CA50, CA49, CA48, CA47, and CA46. The third output filter capacitor group 15 includes capacitors CC44, CC52, CA36, CA38, CA15, CA16, CA31, and CA12. The fourth output filter capacitor group 158 includes capacitors CB46, CB45, CB53, CC43, CA32, CA25, CA28, and CC40.

As shown in FIG. 1B, the first, second, third and fourth output filter capacitor groups 152-158 are each connected between the terminal B of the first phase transformer T2A and the source of each of the power switches in the first circuit 100. Specifically, each capacitor in each of the output filter capacitor groups is connected between the terminal B and the source.

Figures 1C, 1D:
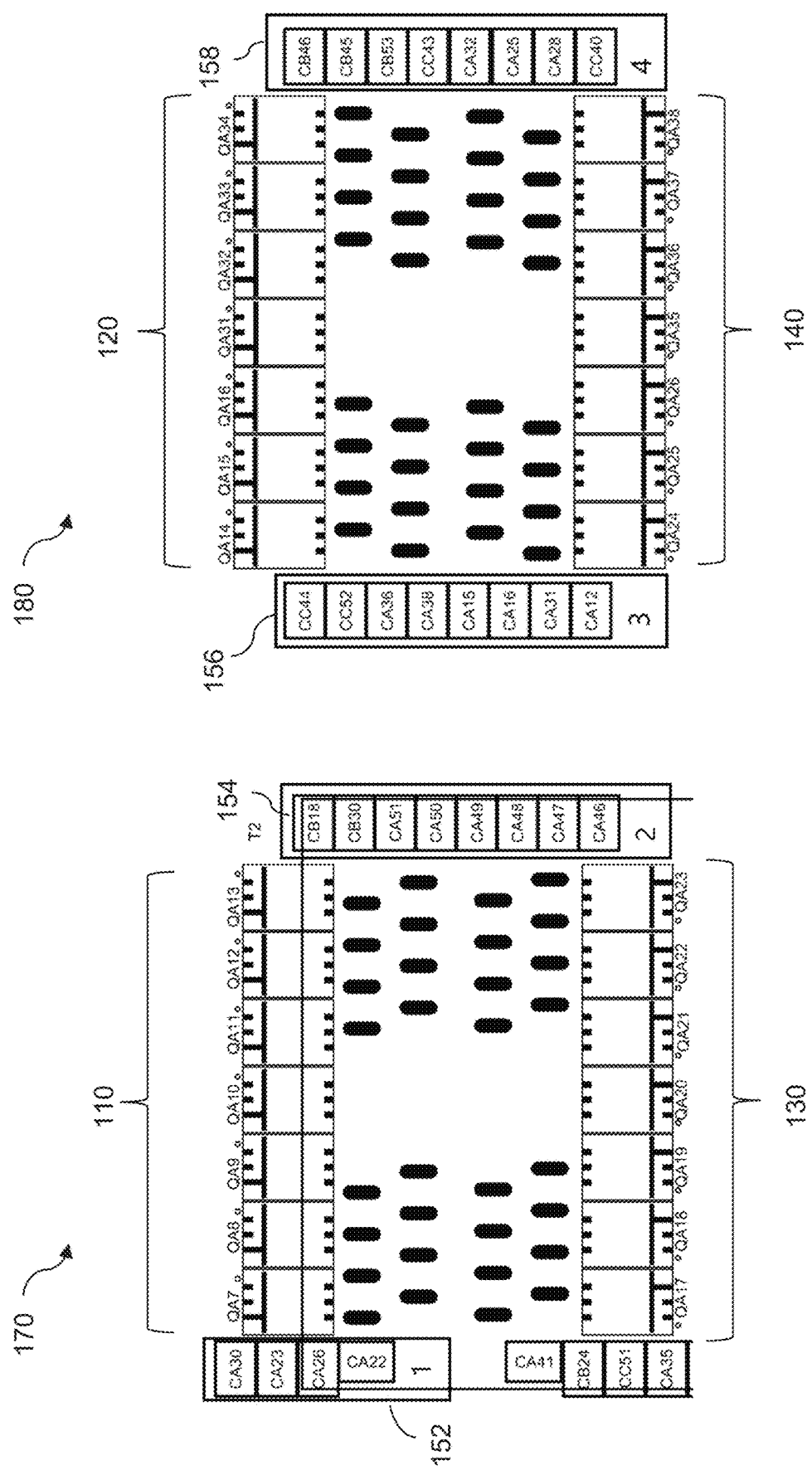
FIGS. 1C and 1D are schematic diagrams showing an example layout of the first circuit on a PCB in accordance with various embodiments of the present disclosure.

In some embodiments, the three-phase integrated transformer may be placed on the top layer/surface of a circuit board, e.g., a printed circuit board (PCB). FIGS. 1C and 1D show an example layout of the first circuit 100 on the PCB according to some embodiments of the present disclosure, including a layout 170 on the top layer of the PCB and a layout 180 on the bottom layer of the PCB.

Figure 11:
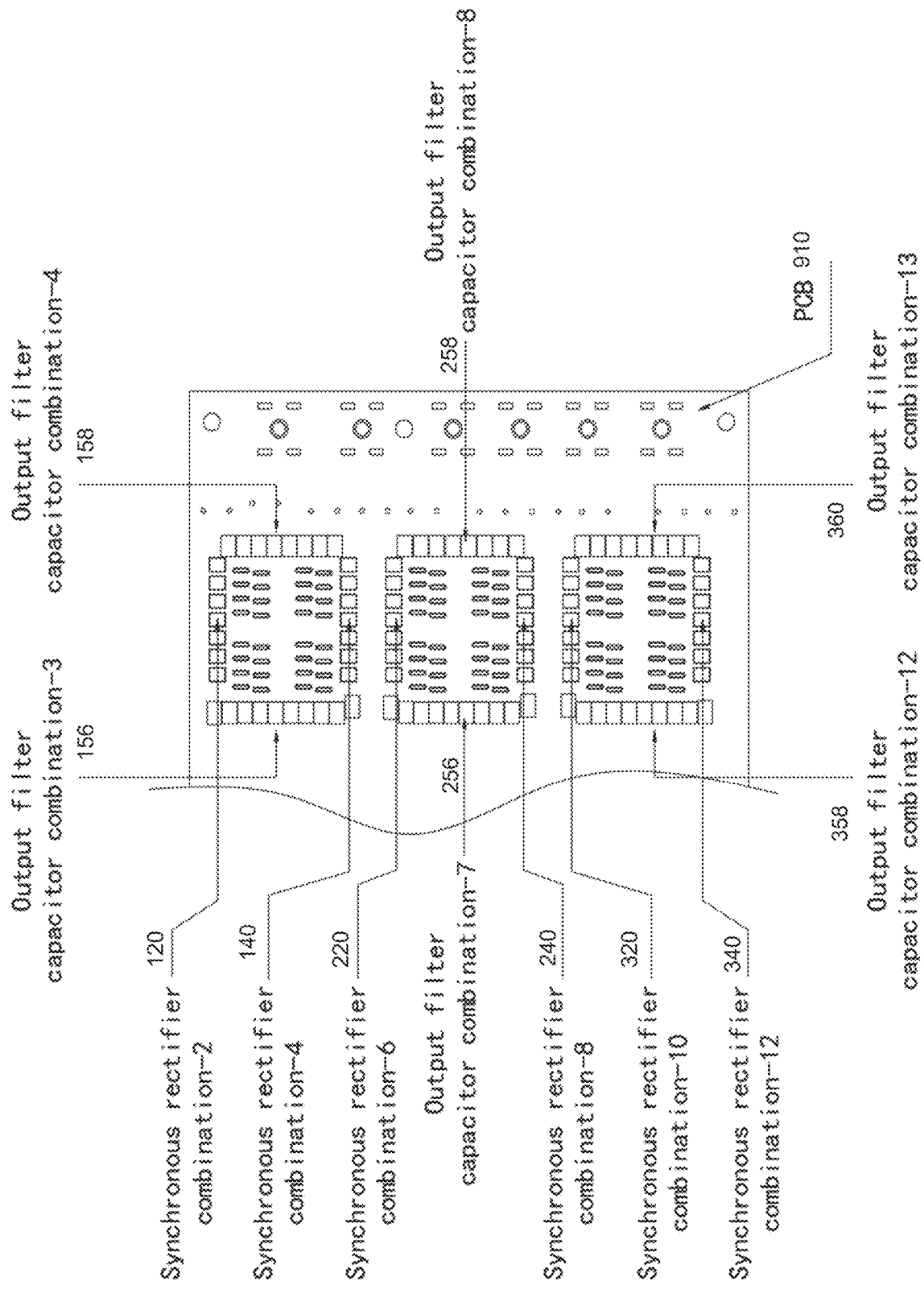
FIG. 11 is a schematic diagram showing a bottom view of the circuit in FIG. 9 in accordance with various embodiments of the present disclosure.

The first synchronous rectifier group 110 may be placed on the top layer of the PCB and adjacent to the first phase transformer T2A (see also FIG. 11). The first synchronous rectifier group 110 may be placed along and adjacent to a first side of the first phase transformer T2A. The first side may be along a longitudinal direction of the first phase transformer T2A, i.e., the first side is perpendicular to a winding direction of the first phase transformer T2A. The second synchronous rectifier group 120 may be placed on the bottom layer of the PCB opposite to the first synchronous rectifier group 110. The second synchronous rectifier group 120 is placed along the first side of the first phase transformer T2A on the bottom layer of the PCB. The second synchronous rectifier group 120 may be vertically aligned with the first synchronous rectifier group 110.

The third synchronous rectifier group 130 may be placed on the top layer of the PCB and adjacent to the first phase transformer (see also FIG. 11). The third synchronous rectifier group 130 may be placed along and adjacent to a second side of the first phase transformer T2A that is opposite to the first side of the first phase transformer T2A. That is, the first synchronous rectifier group 110 and the third synchronous rectifier group 130 are along and adjacent to two opposite sides of the first phase transformer T2A, where the two opposite sides are in the longitudinal direction of the first phase transformer T2A. The fourth synchronous rectifier group 140 may be placed on the bottom layer of the PCB and on the opposite side of the third synchronous rectifier group 130 with respect to the PCB. The fourth synchronous rectifier group 140 may be vertically aligned with the third synchronous rectifier group 130. The fourth synchronous rectifier group 140 is placed along the second side of the first phase transformer T2A on the bottom layer of the PCB.

The first output filter capacitor group 152 may be placed on the top layer of the PCB along a third side of the first phase transformer T2A. The third side may be in the winding direction of the first phase transformer T2A, and is perpendicular to the first side and the second side of the first phase transformer T2A. In an example, the first output filter capacitor group 152 may occupy a portion of the space along the third side of the first phase transformer T2A. As shown in FIG. 1C, the first output filter capacitor group 152 is placed on the upper left portion of the third side.

The second output filter capacitor group 154 may be placed on the top layer of the PCB, and placed along a fourth side of the first phase transformer T2A, where the fourth side is opposite to the third side of the first phase transformer T2A. The third output filter capacitor group 156 and the fourth output filter capacitor group 158 may be placed on the bottom layer of the PCB, and placed along the third side and fourth side of the first phase transformer T2A, respectively. The first output filter capacitor group 152 may be vertically aligned with the third output filter capacitor group 156. The second output filter capacitor group 154 may be vertically aligned with the fourth output filter capacitor group 158.

In some embodiments, the first, second, third and fourth synchronous rectifier groups 110, 120, 130 and 140 and the first, second, third and fourth output filter capacitor groups 152, 154, 156 and 158 may be placed close to the secondary side output terminals (e.g., the terminals A, B, and C) of the first phase transformer T2A within an allowable range of process to ensure generally the lowest voltage conversion loss and highest efficiency of the first phase transformer. The distances of the synchronous rectifier groups and the output filter capacitor groups to the terminals may be in range(s) that are allowed or possible based on the circuit board manufacturing techniques.

In accordance with some embodiments, the power switches of FIG. 1A may be metal oxide semiconductor field-effect transistor (MOSFET) devices, bipolar junction transistor (BJT) devices, super junction transistor (SJT) devices, insulated gate bipolar transistor (IGBT) devices, gallium nitride (GaN) based power devices and/or the like.

Figure 2A:
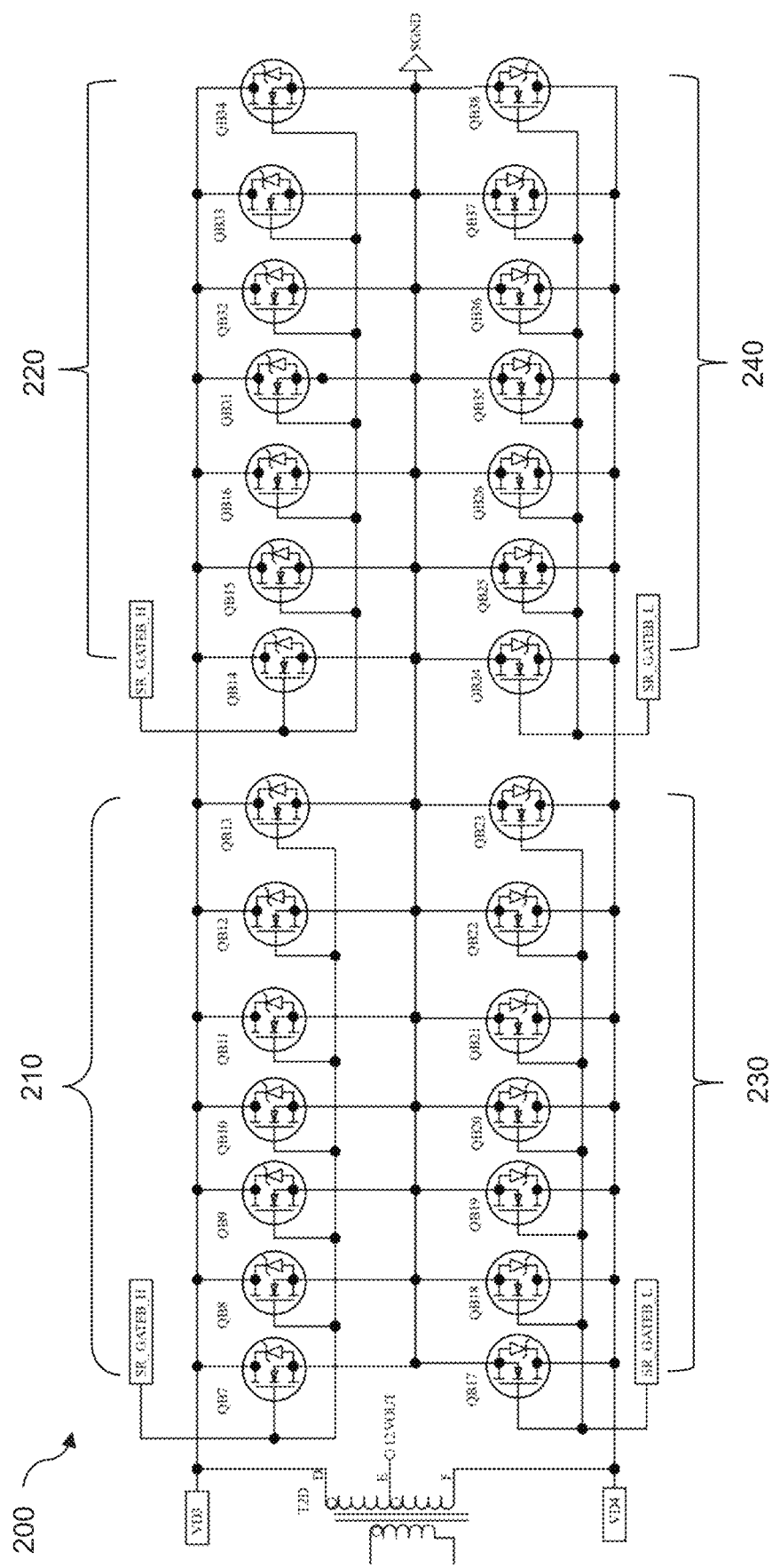
FIG. 2A and FIG. 2B are schematic diagrams showing an example second circuit of the power supply circuit in accordance with various embodiments of the present disclosure.
Figure 2B:
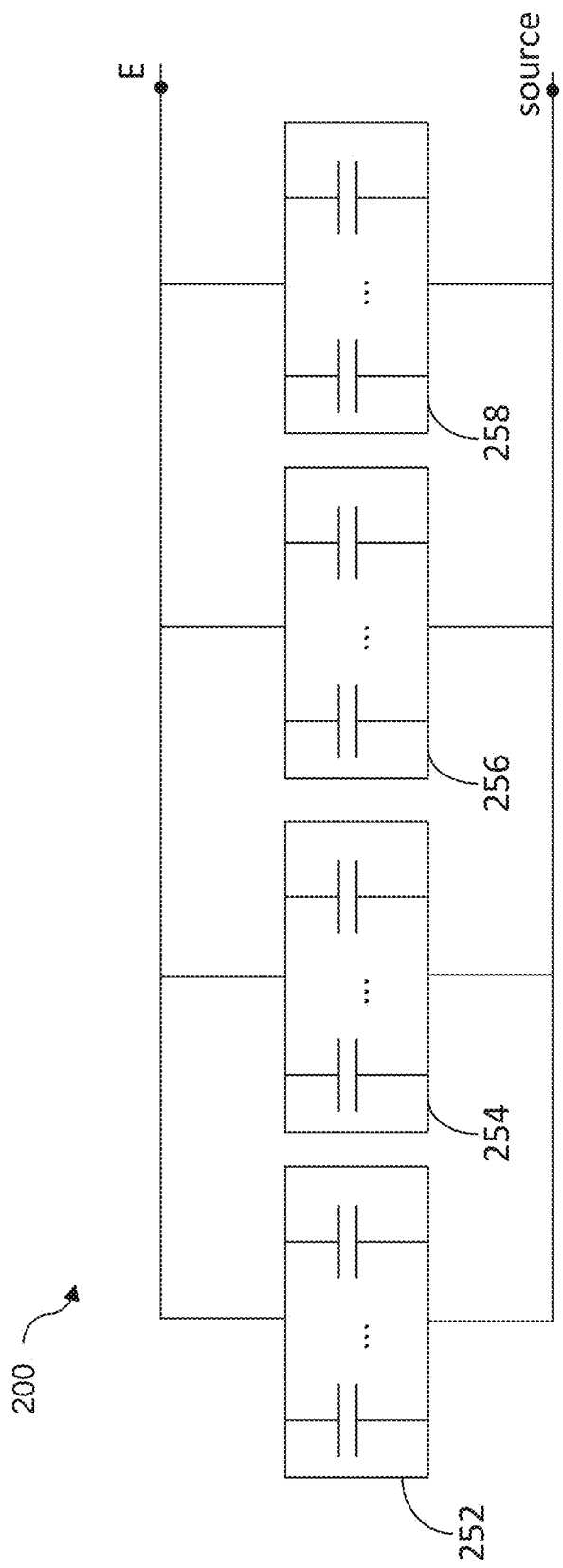

FIG. 2A and FIG. 2B are schematic diagrams showing an example second circuit 200, which is a second part of the power supply circuit, in accordance with various embodiments of the present disclosure. The second circuit 200 includes the second phase transformer T2D of the three-phase integrated transformer and associated synchronous rectifiers and output filter capacitors. The secondary side of the second phase transformer T2D includes three terminals D, E and F. The terminal B is coupled to the power output V12OUT.

In some embodiments, as shown in FIG. 2A, the synchronous rectifiers include four synchronous rectifier groups, i.e., the fifth to eighth synchronous rectifier groups 210, 220, 230 and 240. The fifth synchronous rectifier group 210 includes power switches QB7, QB8, QB9, QB10, QB11, QB12, and QB13. The sixth synchronous rectifier group 220 includes power switches QB14, QB15, QB16, QB31, QB32, QB33, and QB34. The seventh synchronous rectifier group 230 includes power switches QB17, QB18, QB19, QB20, QB21, QB22, and QB23. The eighth synchronous rectifier group 240 includes power switches QB24, QB25, QB26, QB35, QB36, QB37, and QB38.

The fifth and sixth synchronous rectifier groups 210 and 220 are each connected between the terminal D of the second phase transformer T2D and the terminal SGND. As an example, as shown in FIG. 2A, each of the power switches in the fifth and sixth synchronous rectifier groups 210 and 220 has the drain coupled to the terminal D, and the source coupled to the terminal SGND, with the gate coupled to a gate driving signal (SR_GATEB_H). The seventh and eighth synchronous rectifier groups 230 and 240 are each connected between the terminal F of the second phase transformer T2D and the terminal SGND. As an example, each of the power switches in the rectifier groups 230 and 240 has the drain coupled to the terminal F, and the source coupled to the terminal SGND, with the gate coupled to a gate driving signal (SR_GATEB_L).

In some embodiments, the output filter capacitors may be divided into four capacitor groups, i.e., fifth to eighth output filter capacitor groups 252, 254, 256 and 258. The fifth output filter capacitor group 252 includes capacitors CA41, CB24, CC51, CA35, CA39, CA40, CA43, and CA42. The sixth output filter capacitor group 254 includes capacitors CC24, CC34, CB52, CB51, CB50, CB49, CB48, and CB47. The seventh output filter capacitor group 256 includes capacitors CB31, CC14, CB32, CB34, CB38, CB19, CB35, and CB13. The eighth output filter capacitor group 258 includes capacitors CB22, CB21, CB25, CB26, CB23, CB28, CC22, and CC23.

As shown in FIG. 2B, the fifth, sixth, seventh and eighth output filter capacitor groups 252-258 are each connected between the terminal E of the second phase transformer T2D and the source of each of the power switches in the second circuit 200. Specifically, each capacitor in each of these output filter capacitor groups is connected between the terminal E and the source.

Figures 2C, 2D:
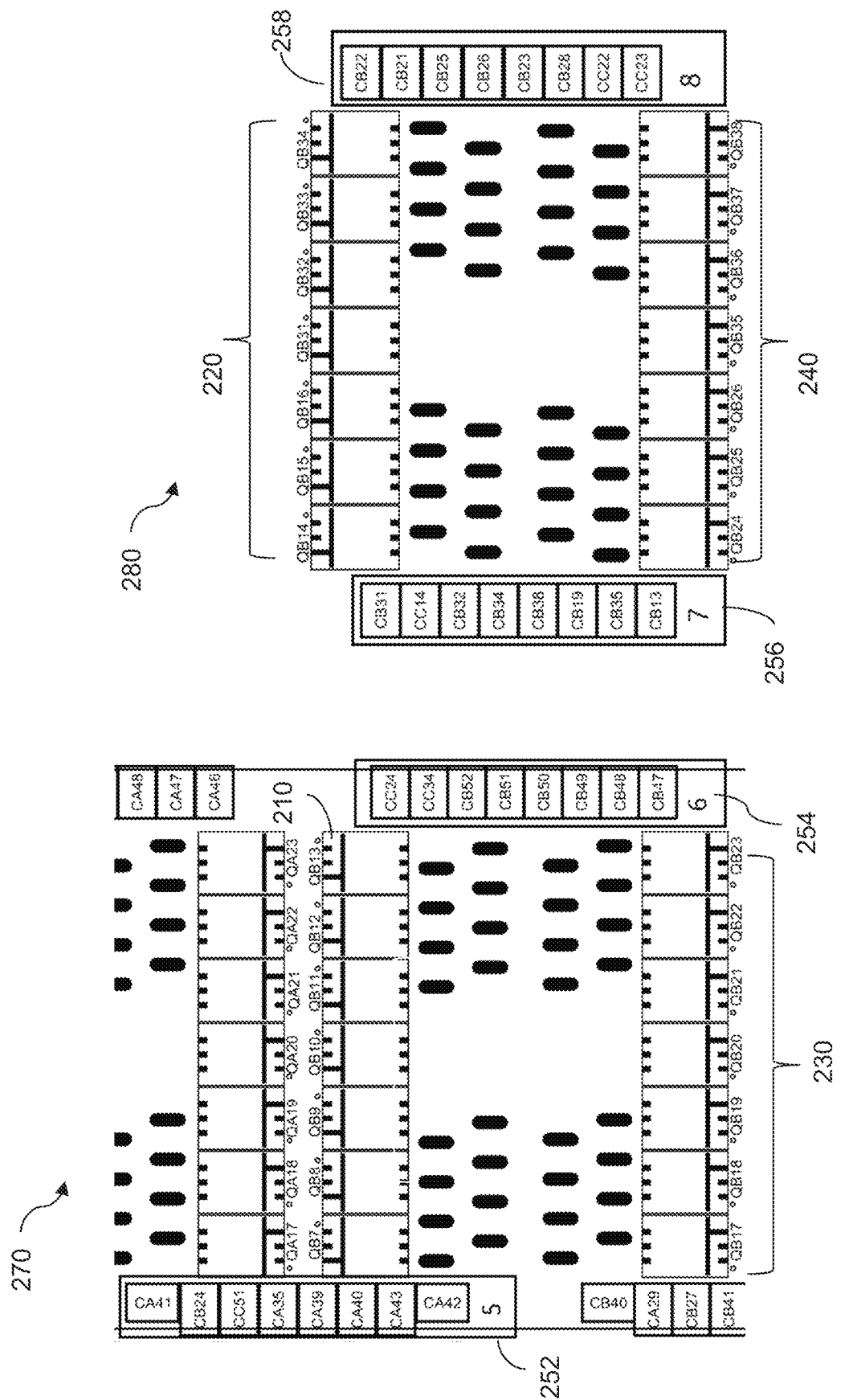
FIGS. 2C and 2D are schematic diagrams showing an example layout of the second circuit on the PCB in accordance with various embodiments of the present disclosure.

FIG. 2C and FIG. 2D show an example layout of the second circuit 200 on the PCB according to some embodiments of the present disclosure, including a layout 270 on the top layer of the PCB and a layout 280 on the bottom layer of the PCB. The fifth synchronous rectifier group 210 may be placed on the top layer of the PCB and directly adjacent to the second phase transformer T2D (see also FIG. 11). The fifth synchronous rectifier group 210 may be placed along and adjacent to a first side of the second phase transformer T2D. The first side may be along a longitudinal direction of the second phase transformer T2D, i.e., the first side is perpendicular to a winding direction of the second phase transformer T2D. The first side of the second phase transformer T2D may be parallel to the first side of the first phase transformer T2A as described above.

The sixth synchronous rectifier group 220 may be placed on the bottom layer of the PCB and placed on the opposite side of the fifth synchronous rectifier group 210 with respect to the PCB. The sixth synchronous rectifier group 220 may be vertically aligned with the fifth synchronous rectifier group 210. The six synchronous rectifier group 220 is placed along the first side of the second phase transformer T2D on the bottom layer of the PCB.

The seventh synchronous rectifier group 230 may be placed on the top layer of the PCB and placed adjacent to the second phase transformer (see also FIG. 11). The seventh synchronous rectifier group 230 may be placed along and adjacent to a second side of the second phase transformer T2D that is opposite to the first side of the second phase transformer T2D. That is, the seventh synchronous rectifier group 230 and the fifth synchronous rectifier group 210 are along and adjacent to two opposite sides of the second phase transformer T2D, where the two opposite sides are in the longitudinal direction of the second phase transformer T2D.

The eighth synchronous rectifier group 240 may be placed on the bottom layer of the PCB and on the opposite side of the seventh synchronous rectifier group 230. The eighth synchronous rectifier group 240 may be vertically aligned with the seventh synchronous rectifier group 230. The eighth synchronous rectifier group 240 is placed along the second side of the second phase transformer T2D on the bottom layer of the PCB.

The fifth output filter capacitor group 252 may be placed on the top layer of the PCB along a third side of the second phase transformer T2D. The third side may be in the winding direction of the second phase transformer T2D, and is perpendicular to the first side and the second side of the second phase transformer T2D. In an example, as shown in FIG. 2C, the fifth output filter capacitor group 252 may occupy a portion (e.g., upper left portion as shown) of the space along the third side of the second phase transformer T2D, and extend to the third side of the first phase transformer T2A. The third side of the second phase transformer T2D may be in the same direction as the third side of the first phase transformer T2A.

The sixth output filter capacitor group 254 may be placed on the top layer of the PCB and placed on a fourth side of the second phase transformer T2D that is opposite to the third side of the second phase transformer T2D. The seventh output filter capacitor group 256 and the eighth output filter capacitor group 258 may be placed on the bottom layer of the PCB and placed along the third side and fourth side of the second phase transformer T2D, respectively. The fifth output filter capacitor group 252 may be vertically aligned with the seventh output filter capacitor group 256. The sixth output filter capacitor group 254 may be vertically aligned with the eighth output filter capacitor group 258.

In some embodiments, the fifth, sixth, seventh and eighth synchronous rectifier groups 210, 220, 230, and 240 and the fifth, sixth, seventh and eighth output filter capacitor groups 252, 254, 256 and 258 may be placed close to the secondary side output terminals (e.g., the terminals D, E and F) of the second phase transformer T2D within the allowable range of process to ensure the lowest voltage conversion loss and highest efficiency of the second phase. The distances of the synchronous rectifier groups and the output filter capacitor groups to the terminals may be in range(s) that are allowed or possible based on the circuit board manufacturing techniques.

In accordance with some embodiments, the power switches of FIG. 2A may be metal oxide semiconductor field-effect transistor (MOSFET) devices, bipolar junction transistor (BJT) devices, super junction transistor (SJT) devices, insulated gate bipolar transistor (IGBT) devices, gallium nitride (GaN) based power devices and/or the like.

Figure 3A:
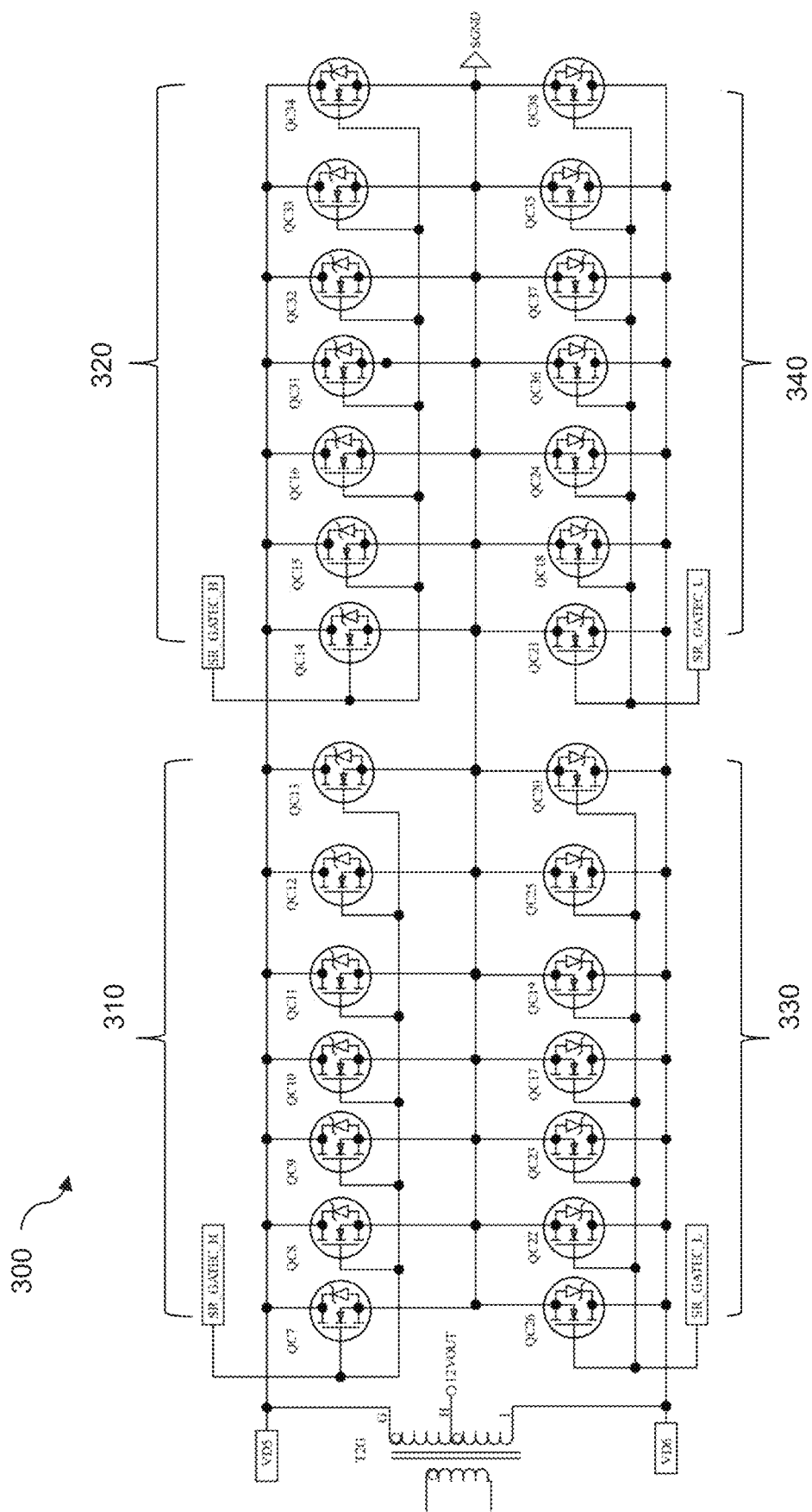
FIG. 3A and FIG. 3B are schematic diagrams showing an example third circuit of the power supply circuit in accordance with various embodiments of the present disclosure.
Figure 3B:
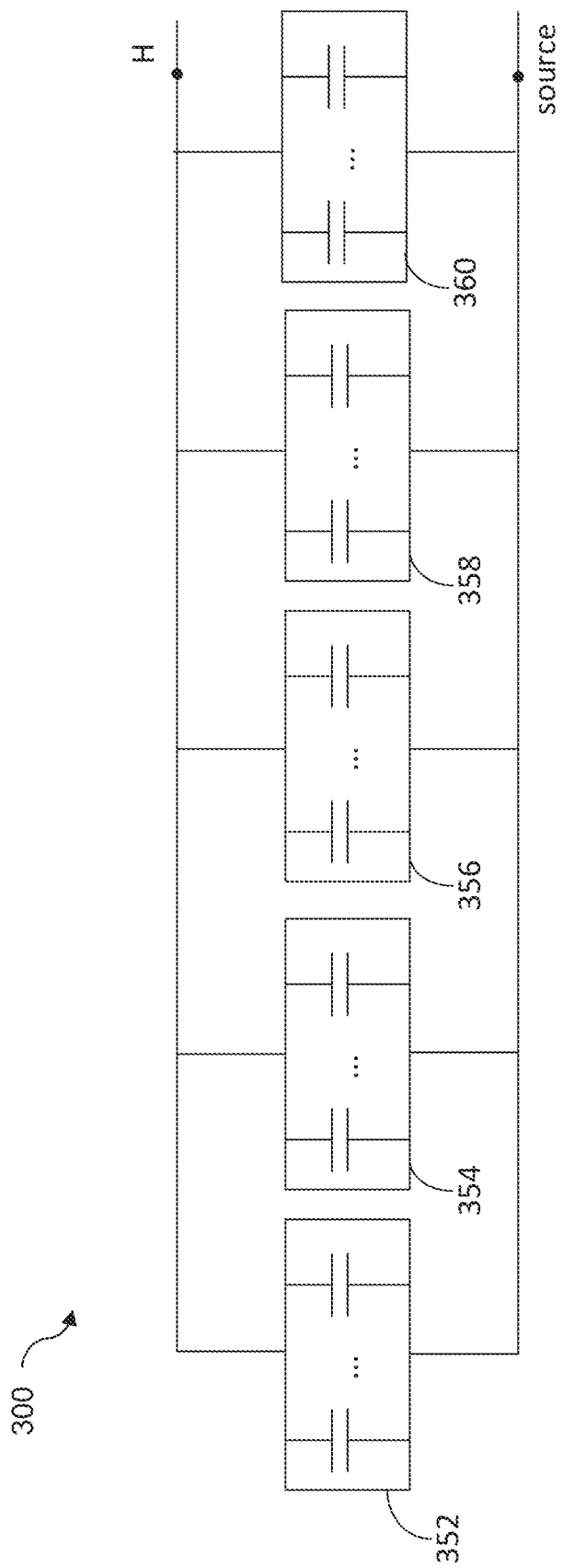

FIG. 3A and FIG. 3B are schematic diagrams showing an example third circuit 300, which may be a third part of the power supply circuit, in accordance with various embodiments of the present disclosure. The third circuit 300 includes the third phase transformer T2G of the three-phase integrated transformer and associated synchronous rectifiers and output filter capacitors. The secondary side of the third phase transformer T2G includes three terminals G, H and I. The terminal H is coupled to a power output (12VOUT).

In some embodiments, as shown in FIG. 3A, the synchronous rectifiers include four synchronous rectifier groups, i.e., nineth to twelfth synchronous rectifier groups 310, 320, 330 and 340. The ninth synchronous rectifier group 310 includes power switches QC7, QC8, QC9, QC10, QC11, QC12, and QC13. The tenth synchronous rectifier group 320 includes power switches QC14, QC15, QC16, QC31, QC32, QC33, and QC34. The eleventh synchronous rectifier group 330 includes power switches QC17, QC19, QC20, QC22, QC23, QC25, and QC26. The twelfth synchronous rectifier group 340 includes power switches QC21, QC18, QC24, QC36, QC37, QC35, and QC38.

The ninth and tenth synchronous rectifier groups 310 and 320 are each connected between the terminal G of the third phase transformer T2G and the terminal SGND. As an example, as shown in FIG. 3A, each of the power switches in the nineth and tenth synchronous rectifier groups 310 and 320 has the drain coupled to the terminal G, and the source coupled to the terminal SGND, with the gate coupled to a gate driving signal (SR_GATEC_H). The eleventh and twelfth synchronous rectifier groups 330 and 340 are each connected between the terminal I of the third phase transformer T2G and the terminal SGND. As an example, each of the power switches in the rectifier groups 330 and 340 has the drain coupled to the terminal I, and the source coupled to the terminal SGND, with the gate coupled to a gate driving signal (SR_GATEC_L).

In some embodiments, the output filter capacitors may be divided into five capacitor groups, i.e., nineth to thirteenth output filter capacitor groups 352, 354, 356, 358 and 360.

The ninth output filter capacitor group 352 includes capacitors CB40, CA29, CB27, CB41, CB43, CB44, CB39, and CB42. The tenth output filter capacitor group 354 includes capacitors CC11, CA27, CC50, CC49, CC48, CC47, CC46, and CC45. The eleventh output filter capacitor group 356 includes capacitors CC36, CC39, CC37, and CC42. The twelfth output filter capacitor group 358 includes capacitors CA34, CA37, CC17, CC18, CC31, CC32, CC33, and CC35. The thirteenth output filter capacitor group 360 includes capacitors CC30, CC21, CC28, CC26, CB36, CC41, CC25, and CC20. These capacitors are shown in FIGS. 3C-3D.

The ninth, tenth, eleventh, twelfth and thirteenth output filter capacitor groups 352-360 may each be connected between the terminal H of the third phase transformer T2G and the source of each of the power switches in the third circuit 300, as shown in FIG. 3B. Specifically, each capacitor in each of these output filter capacitor groups is connected between the terminal H and the sources.

FIG. 3C and FIG. 3D show an example layout of the third circuit 300 on the PCB according to some embodiments of the present disclosure, including a layout 370 on the top layer of the PCB, and a layout 380 on the bottom layer of the PCB.

The ninth synchronous rectifier group 310 may be placed on the top layer of the PCB and directly adjacent to the third phase transformer T2G (see also in FIG. 11). The ninth synchronous rectifier group 310 may be placed along and adjacent to a first side of the third phase transformer T2G. The first side may be along a longitudinal direction of the third phase transformer T2G, i.e., the first side is perpendicular to a winding direction of the third phase transformer T2G. The first side of the third phase transformer T2G may be parallel to the first side of the first phase transformer T2A and/or the first side of the second phase transformer T2D as described above.

The tenth synchronous rectifier group 320 may be placed on the bottom layer of the PCB and placed on the opposite side of the ninth synchronous rectifier group 310. The tenth synchronous rectifier group 320 may be vertically aligned with the ninth synchronous rectifier group 310. The tenth synchronous rectifier group 320 is placed along the first side of the third phase transformer T2G on the bottom layer of the PCB.

The eleventh synchronous rectifier group 330 may be placed on the top layer of the PCB and placed directly adjacent to the third phase transformer T2G (see also FIG. 11). The eleventh synchronous rectifier group 330 may be placed along and adjacent to a second side of the third phase transformer T2G that is opposite to the first side of the third phase transformer T2G. That is, the eleventh synchronous rectifier group 330 and the ninth synchronous rectifier group 310 are along and adjacent to two opposite sides of the third phase transformer T2G, where the two opposite sides are in the longitudinal direction of the third phase transformer T2G. The twelfth synchronous rectifier group 340 may be placed on the bottom layer of the PCB and placed on the opposite side of the eleventh synchronous rectifier group 330. The twelfth synchronous rectifier group 340 may be vertically aligned with the eleventh synchronous rectifier group 330. The twelfth synchronous rectifier group 340 is placed along the second side of the third phase transformer T2G on the bottom layer of the PCB.

The ninth output filter capacitor group 352 may be placed on the top layer of the PCB along a third side of the third phase transformer T2G. The third side may be in the winding direction of the third phase transformer T2G, and is perpendicular to the first side and the second side of the third phase transformer T2G. In an example, as shown in FIG. 3C, the nineth output filter capacitor group 352 may occupy a portion (e.g., upper left portion as shown) of the space along the third side of the third phase transformer T2G, and extend to the third side of the second phase transformer T2D. The third side of the third phase transformer T2G may be in the same direction as the third side of the second phase transformer T2D.

The tenth output filter capacitor group 354 may be placed on the top layer of the PCB and placed on a fourth side of the third phase transformer T2G that is opposite to the third side of the third phase transformer T2G. The eleventh output filter capacitor group 356 may be placed on the top layer of the PCB, and placed along the third side of the third phase transformer T2G, occupying another portion of the space on the third side (e.g., the lower left portion as shown). The twelfth output filter capacitor group 358 and the thirteenth output filter capacitor group 360 may be placed on the bottom layer of the PCB and placed along the third side and fourth side of the third phase transformer T2G, respectively.

In some embodiments, the ninth, tenth, eleventh and twelfth synchronous rectifier groups 310, 320, 330 and 340, and the ninth, tenth, eleventh, twelfth and thirteenth output filter capacitor groups 352-360 may be placed close to the secondary side output terminals (e.g., the terminals G, H and I) of the third phase transformer T2G within the allowable range of the process to ensure the lowest voltage conversion loss and highest efficiency of the third phase transformer. The distances of the synchronous rectifier groups and the output filter capacitor groups to the terminals are in range(s) that are allowed or possible based on the circuit board manufacturing techniques.

In accordance with some embodiments, the power switches of FIG. 3A may be metal oxide semiconductor field-effect transistor (MOSFET) devices, bipolar junction transistor (BJT) devices, super junction transistor (SJT) devices, insulated gate bipolar transistor (IGBT) devices, gallium nitride (GaN) based power devices and/or the like.

For the circuits 100, 200 and 300, each synchronous rectifier group and each filter capacitor group may be placed close to the transformer output terminals in order to ensure a minimum power loss and highest efficiency, while satisfying the placement requirements of the circuit board process. In addition, such placement can improve the load capacity of the power supply and reduce the output voltage ripple.

Figure 4A:
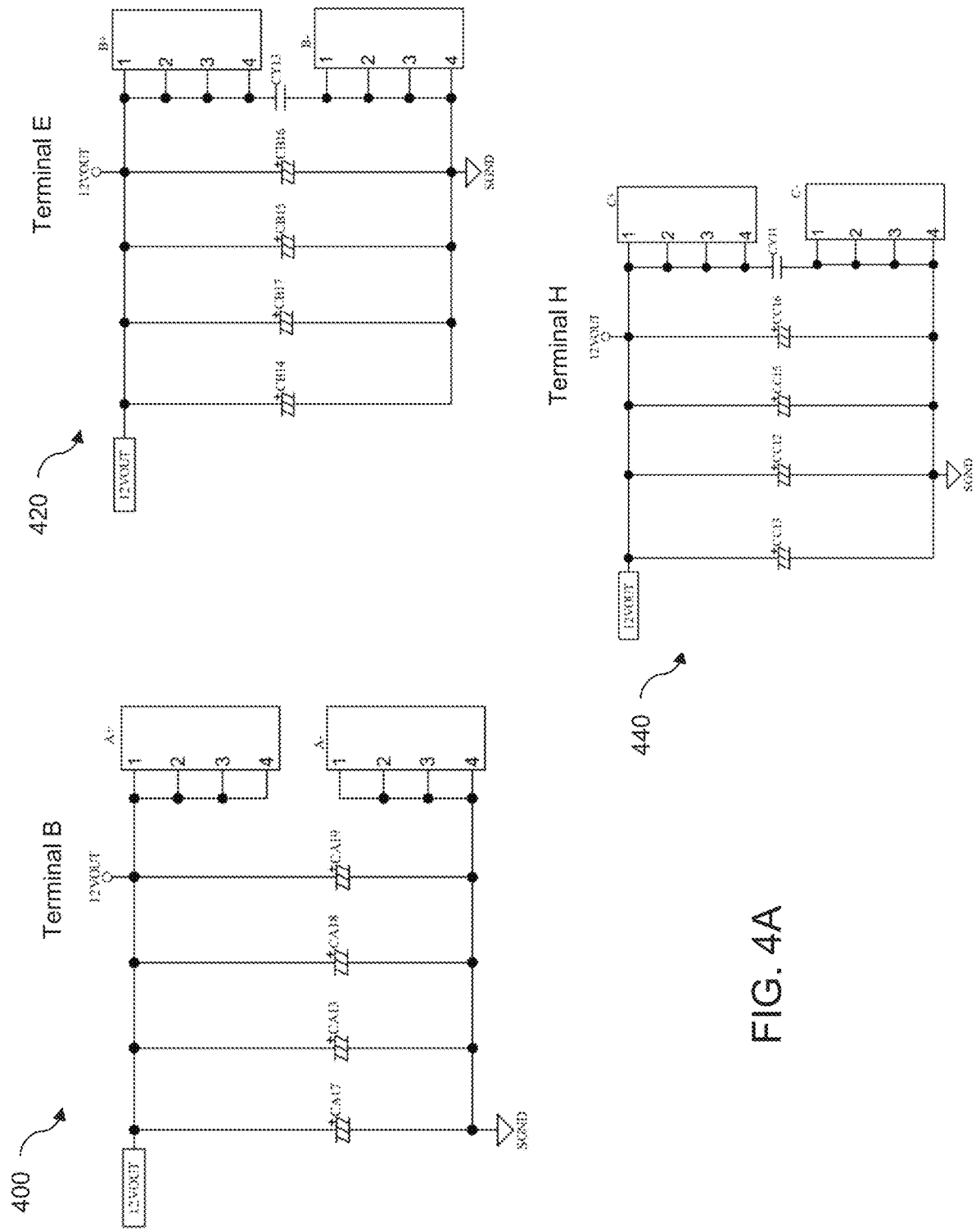
FIG. 4A is a schematic diagram showing an example fourth circuit of the power supply circuit in accordance with various embodiments of the present disclosure.
Figure 4B:
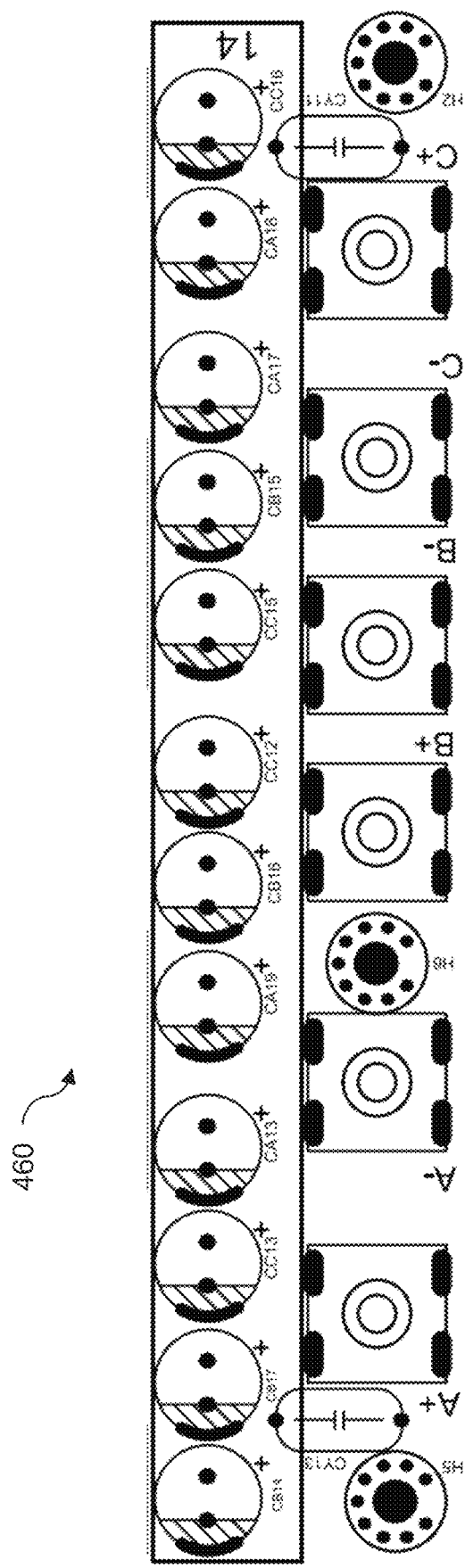
FIG. 4B is a schematic diagram showing an example layout of the fourth circuit on the PCB in accordance with various embodiments of the present disclosure.

FIG. 4A is a schematic diagram showing example circuits 400, 420 and 440, which may be a fourth part of the power supply circuit, in accordance with various embodiments of the present disclosure. The circuits 400, 420 and 440 include an example fourteenth filter capacitor group, which includes capacitors CA13, CA17, CA18, CA19, CB14, CB15, CB16, CB17, CC12, CC13, CC15, and CC16. One or more of these capacitors may be electrolytic capacitors. The capacitors CA13, CA17, CA18, CA19 of the circuit 400 are each connected between the terminal B of the first phase transformer T2A and the terminal SGND, where two terminals of these capacitors are connected to output terminals A+ and A−, respectively. The capacitors CB14, CB15, CB16, CB17 of the circuit 420 are each connected between the terminal E of the second phase transformer T2D and the terminal SGND, where two terminals of these capacitors are connected to output terminals B+ and B−, respectively. The capacitors CC12, CC13, CC15, and CC16 of the circuit 440 are each connected between the terminal H of the third phase transformer T2G and the terminal SGND, where two terminals of these capacitors are connected to output terminals C+ and C−, respectively. The capacitors of the fourteenth output filter capacitor group may be placed close to the output terminals B, E and H, respectively, which can effectively reduce the ripple of the power supply output voltage. FIG. 4B is a schematic diagram of an example layout 460 of the fourteenth filter capacitor group on the PCB. As an example, the fourteenth filter capacitor group may be placed on the top layer of the PCB, e.g., along the third sides of the first, second and third phase transformers (see also FIG. 5A).

The first to fourteenth capacitor groups are marked in the figures with numbers 1-14, respectively, and may also be referred to as capacitor groups 1-14. The first to twelfth synchronous rectifier groups may also be referred to as synchronous rectifier groups 1-12.

Figure 5A:
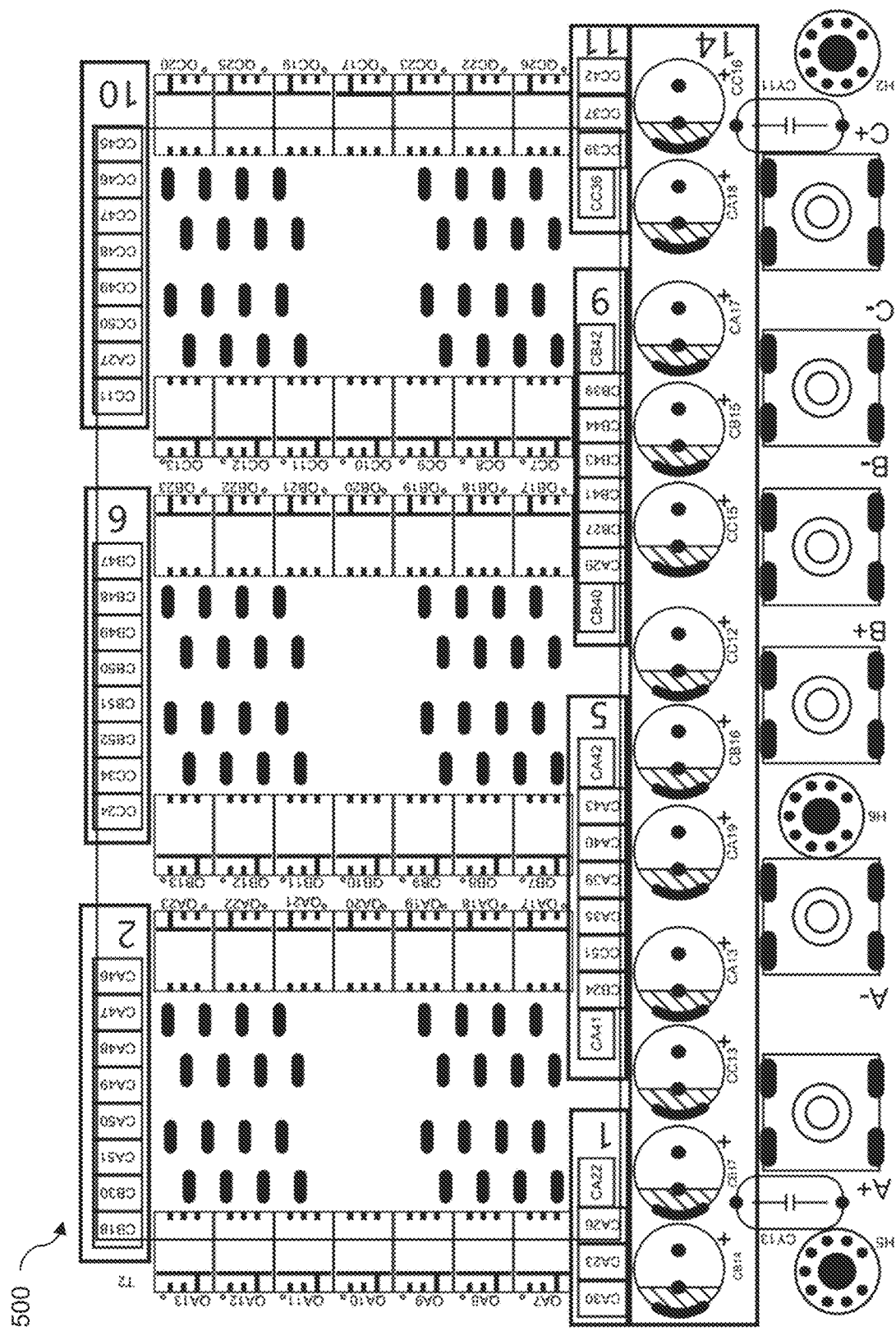
FIG. 5A and FIG. 5B are diagrams illustrating example layouts of the top layer and the bottom layer of the PCB in accordance with various embodiments of the present disclosure
Figure 5B:
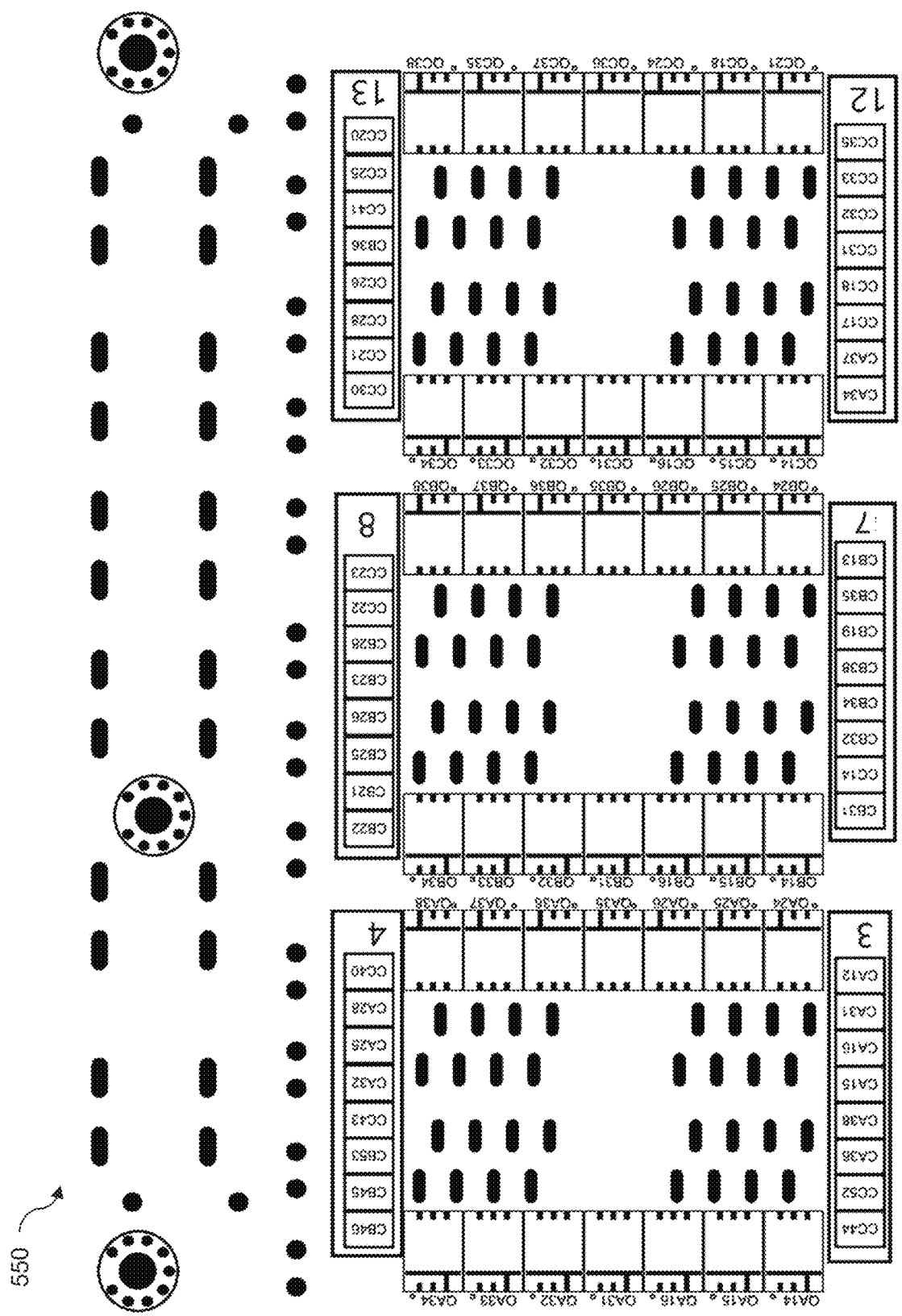

FIG. 5A and FIG. 5B are diagrams illustrating an example layout 500 of the top layer of the PCB and an example layout 550 of the bottom layer of the PCB in accordance with various embodiments of the present disclosure. The layout 500 shows the combination of the layouts 170, 270, 370, 380, and 460 as described above. The layout 550 shows the combination of the layouts 180, 280, and 390 as described above. The output filter capacitor groups 1, 2, 5, 6, 9, 10, 11, and 14 are placed on the top layer of the PCB. The output filter capacitor groups 3, 4, 7, 8, 12 and 13 are placed on the bottom layer of the PCB.

Figure 6:
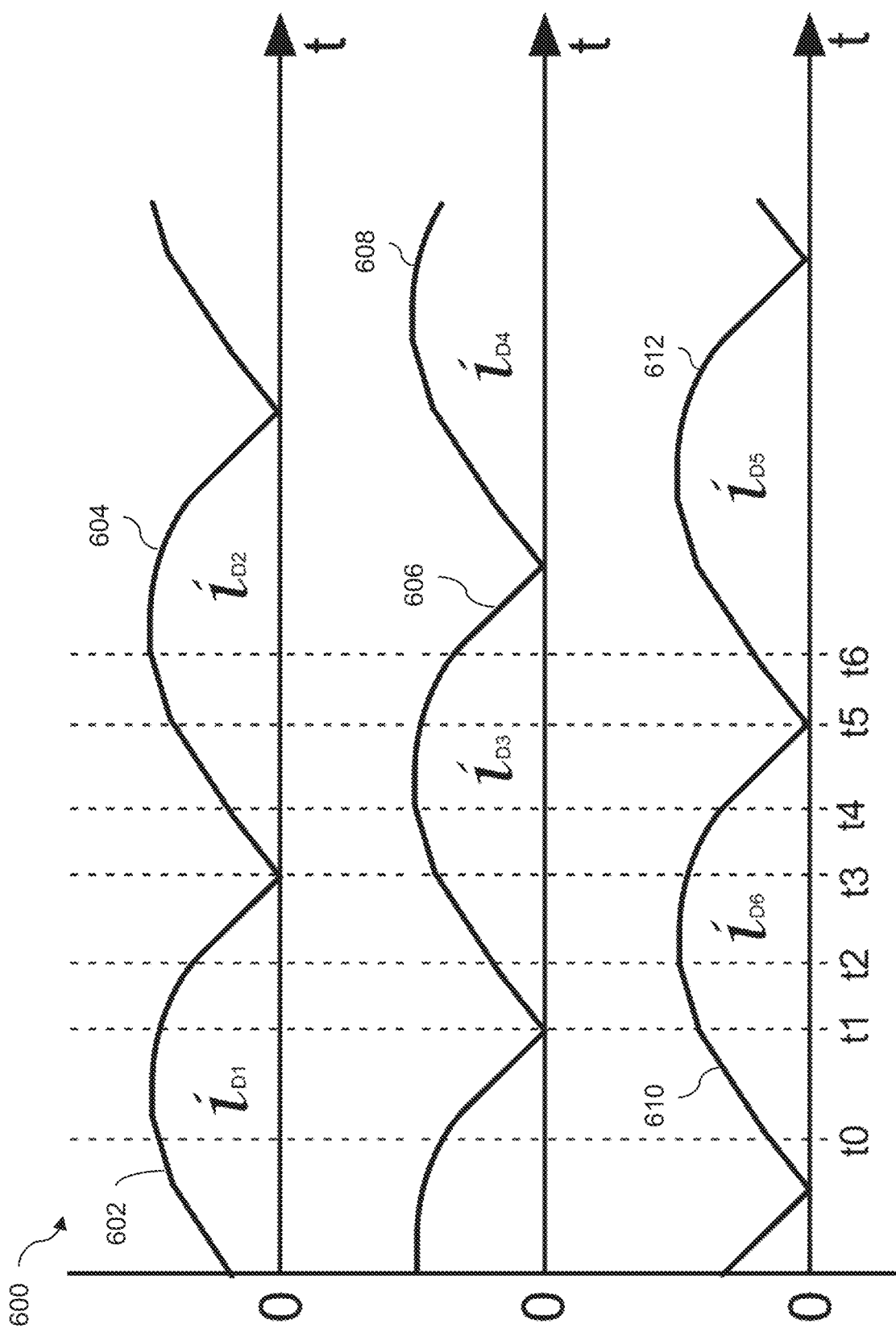
FIG. 6 is a diagram illustrating example current waveforms of synchronous rectifier groups in accordance with various embodiments of the present disclosure.

FIG. 6 is a diagram 600 illustrating example current waveforms of the synchronous rectifier groups 1-12 as described above in accordance with various embodiments of the present disclosure. The curve $i_{D1}$ 602 is the current waveform of the first and second synchronous rectifier groups 110 and 120. The curve $i_{D2}$ 604 is the current waveform of the third and fourth synchronous rectifier groups 130 and 140. The curve $i_{D3}$ 606 is the current waveform of the fifth and sixth synchronous rectifier groups 210 and 220. The curve $i_{D4}$ 608 is the current waveform of the seventh and eighth synchronous rectifier groups 230 and 240. The curve $i_{D5}$ 610 is the current waveform of the ninth and tenth synchronous rectifier groups 310 and 320. The curve $i_{D6}$ 612 is the current waveform of the eleventh and twelfth synchronous rectifier groups 330 and 340.

In the first phase of the three-phase integrated transformer, an example flow path may start from the terminal B of the first phase transformer T2A to the filter capacitor groups 152-158, then to the synchronous rectifier groups (the first and second synchronous rectifier groups 110 and 120, or the third and fourth synchronous rectifier groups 130 and 140), and then back into the transformer terminal (the terminal A or C). The shorter current flow path helps reduce the power loss.

Similarly, in the second phase of the three-phase integrated transformer, an example flow path may start from the terminal E of the second phase transformer T2D to the filter capacitor groups 252-258, then to the synchronous rectifier groups (the fifth and sixth synchronous rectifier groups 210 and 220, or the seventh and eighth synchronous rectifier groups 230 and 240), and then back into the transformer terminal (the terminal D or F). The shorter current flow path helps reduce the power loss.

Figure 7A:
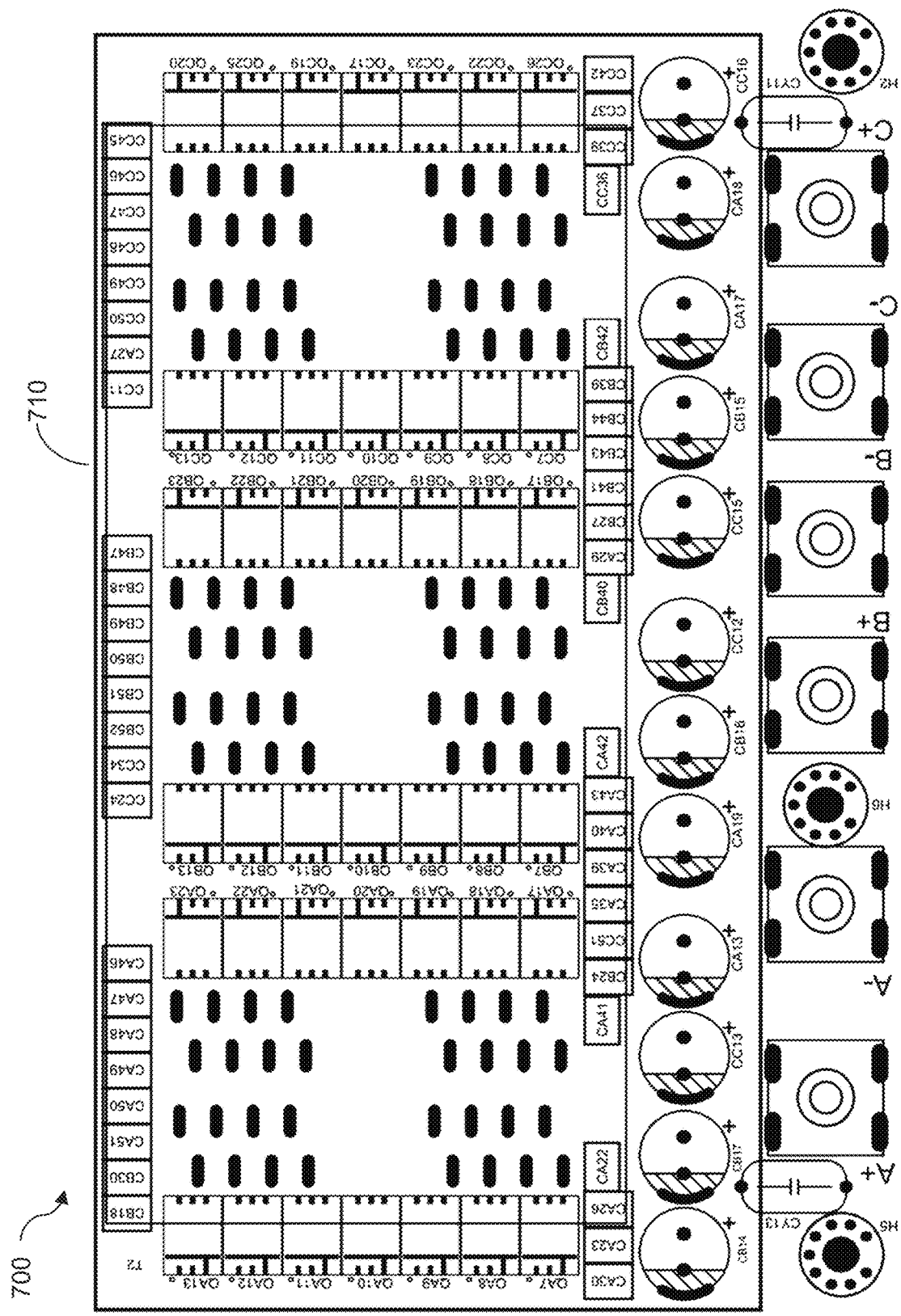
FIG. 7A and FIG. 7B are diagrams illustrating an example PCB in accordance with various embodiments of the present disclosure.
Figure 7B:
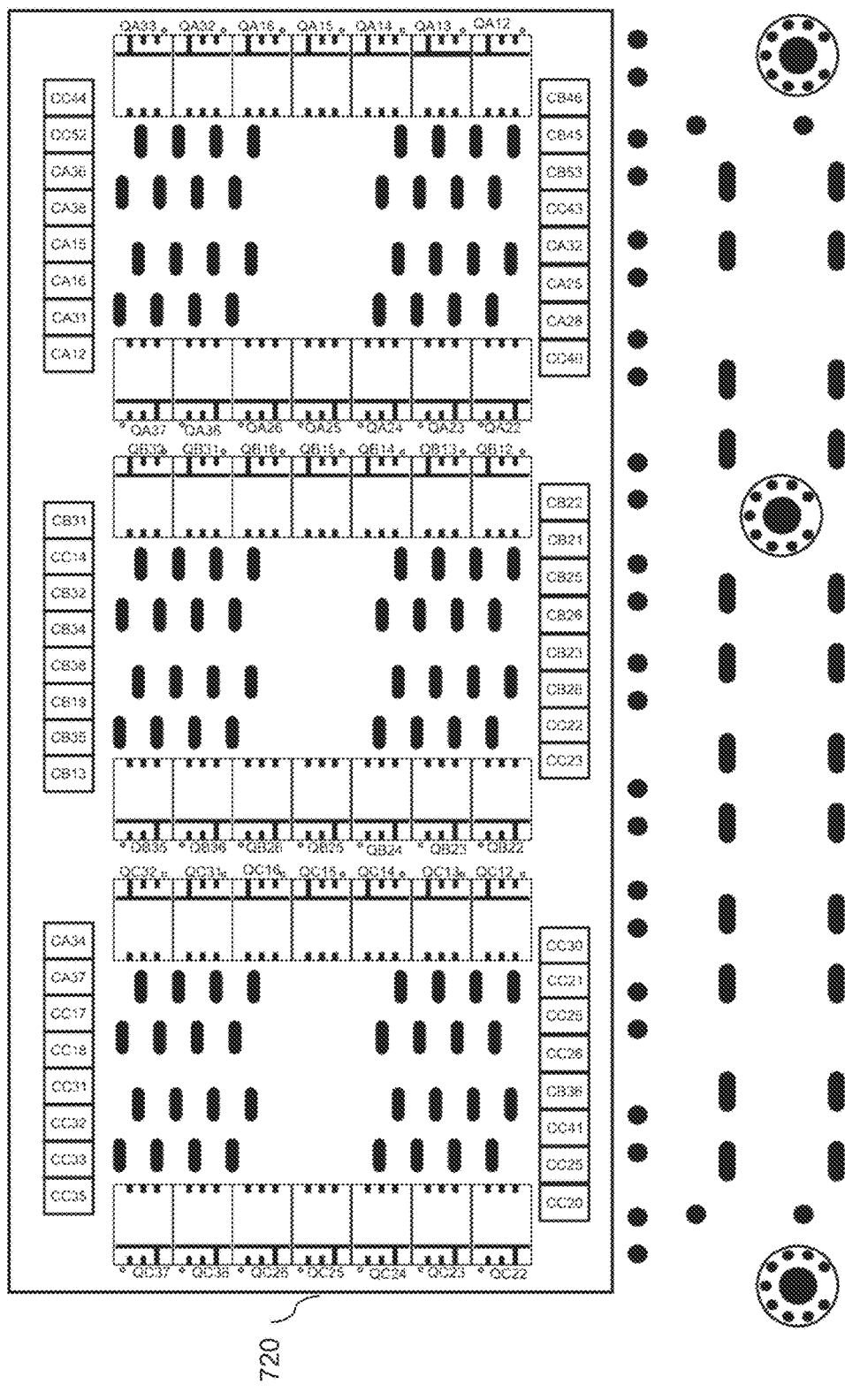

Similarly, in the third phase of the three-phase integrated transformer, an example flow path may start from the terminal H of the third phase transformer T2G to the filter capacitor groups 352-360, then to the synchronous rectifier groups (the nineth and tenth synchronous rectifier groups 310 and 320, or the eleventh and twelfth synchronous rectifier groups 330 and 340), and then back into the transformer terminal (the terminal G or I). The shorter current flow path helps reduce the power loss FIG. 7A and FIG. 7B are diagrams illustrating an example PCB in accordance with various embodiments of the present disclosure, including an example layout 700 of the top layer of the PCB and an example layout 750 of the bottom layer of the PCB. The layout 700 includes a portion 710, which may include a combination of the layouts 170, 270, 370, 380, and 460 as described above. The layout 750 includes a portion 720, which may include a combination of the layouts 180, 280, and 390 as described above. The layouts 700 and 750 may also include other components placed on the top layer and the bottom layer of the PCB. The PCB include the three-phase integrated transformer placed on the top layer of the PCB. Some power switches may be placed on the top layer, and on first two opposite sides of each phase of the three-phase integrated transformer; and some other power switches may be placed on the bottom layer of the PCB, and aligned with the power switches on the top layer, as described above. Some capacitors may be placed on the top layer, and along second two opposite sides of each phase of the three-phase integrated transformer; and some other capacitors may be placed on the bottom layer of the PCB, and aligned with the capacitors on the top layer, as described above.

Figure 8A:
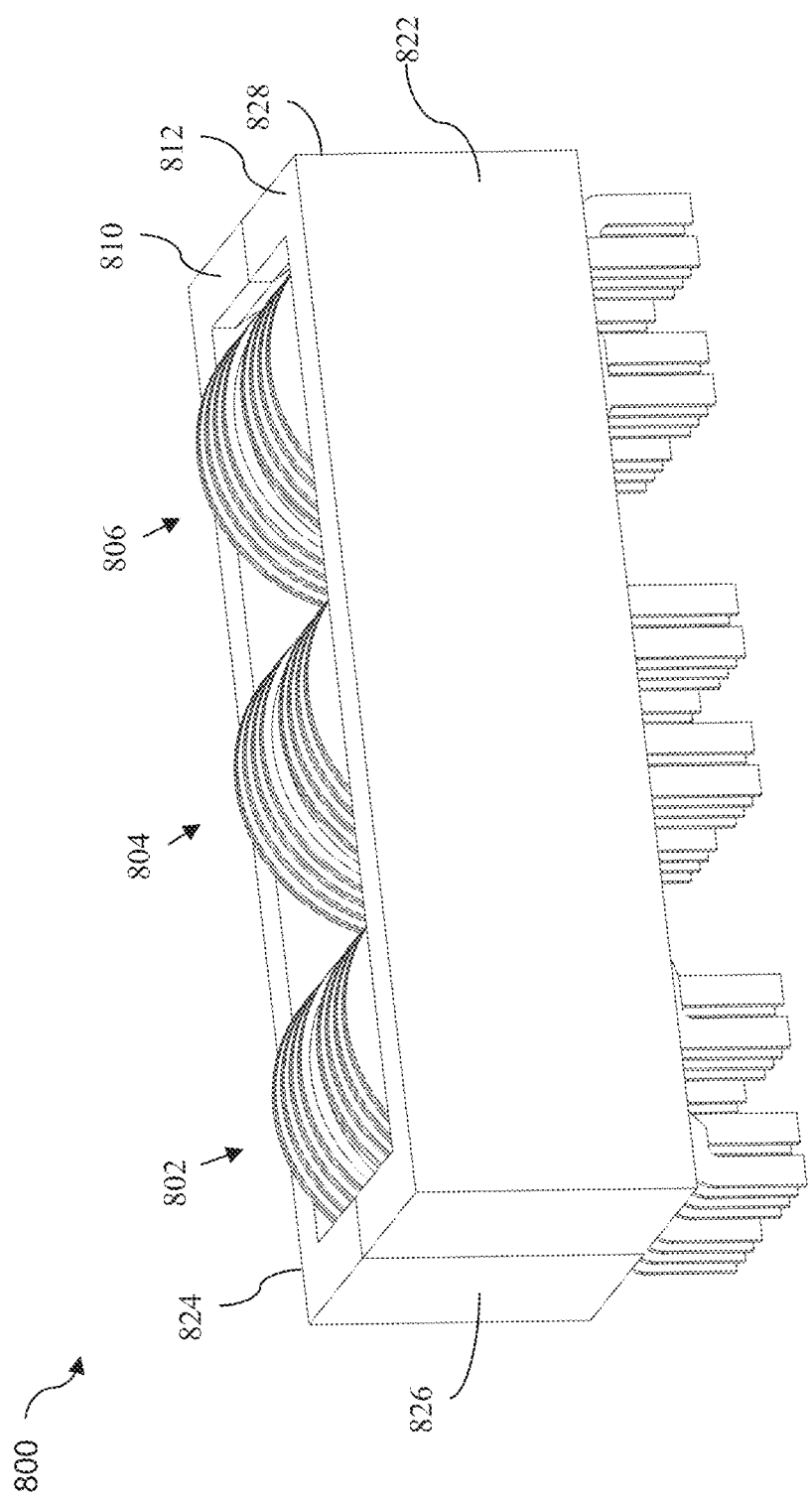
FIG. 8A and FIG. 8B are schematic diagrams illustrating an example three-phase integrated transformer in a perspective view and a front view, in accordance with various embodiments of the present disclosure.

FIG. 8A is a schematic diagram of an example three-phase integrated transformer 800 in a perspective view, in accordance with various embodiments of the present disclosure. The transformer 800 has three phases 802, 804 and 806, and may be used as the three phases T2A, T2D and T2G of the three-phase integrated transformer, respectively. The three-phase integrated transformer 800 includes two cores 810 and 812 facing each other, with windings surrounded by four sidewalls, i.e., opposing sidewalls 822 and 824, and opposing sidewalls 826 and 828. The above described first and second sides of the first phase transformer, second phase transformer and the third phase transformer may be in the direction of the sidewalls 826 and 828, and the third and fourth sides may be in the direction of the sidewalls 822 and 824. In an example, the secondary windings of the three-phase integrated transformer 800 may be formed using metal sheets placed on legs of the cores.

Figure 8B:
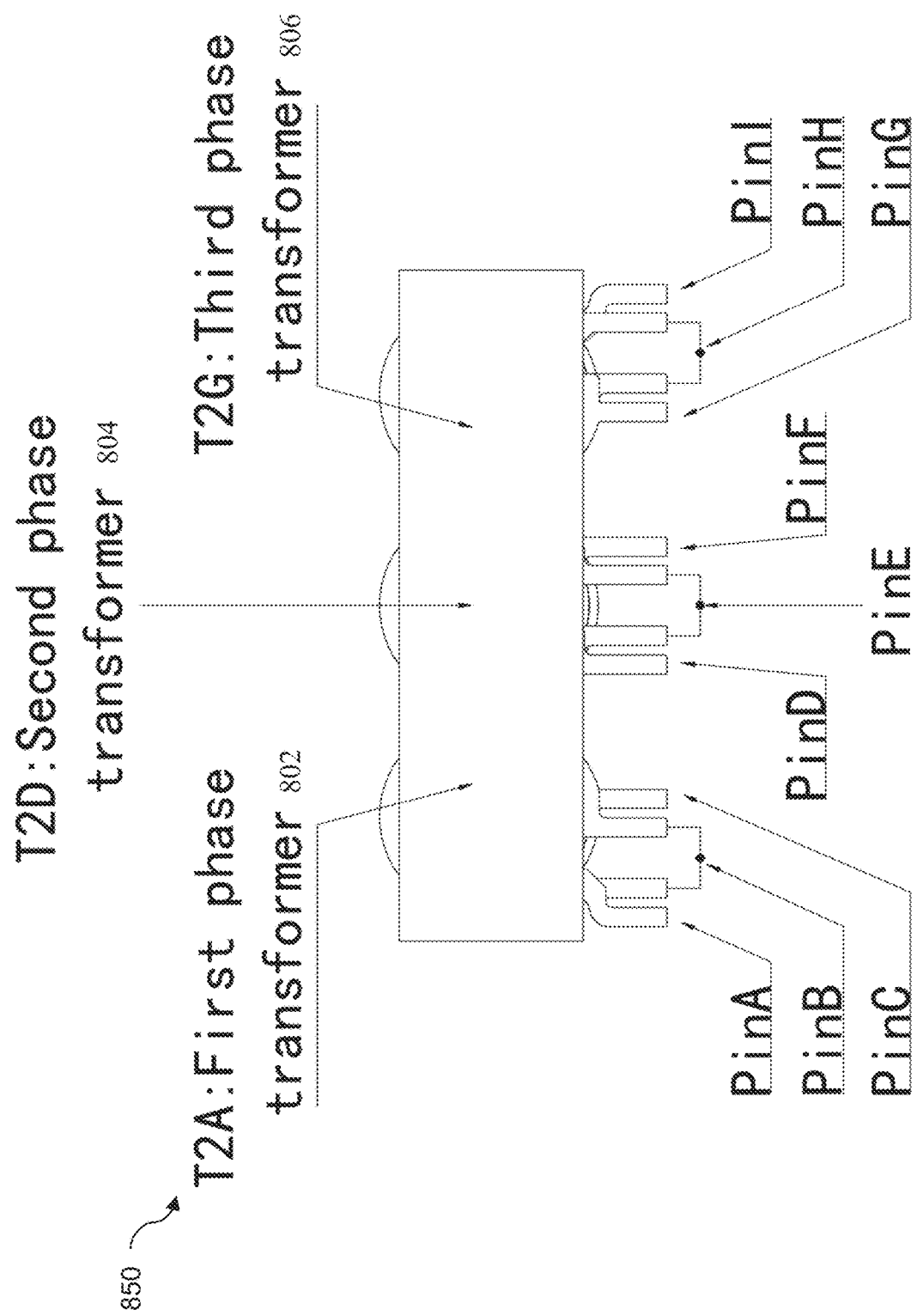

FIG. 8B is a schematic diagram of an example front view 850 of the three-phase integrated transformer 800. The first phase T2A 802 has three terminals, A, B and C, i.e., PinA, PinB and PinC as shown in FIG. 8B. The second phase T2D 804 has three terminals, D, E and F, i.e., PinD, PinE and PinF as shown in FIG. 8B. The third phase T2G 806 has three terminals, G, H and I, i.e., PinG, PinH and PinI and as shown in FIG. 8B.

Figure 9:
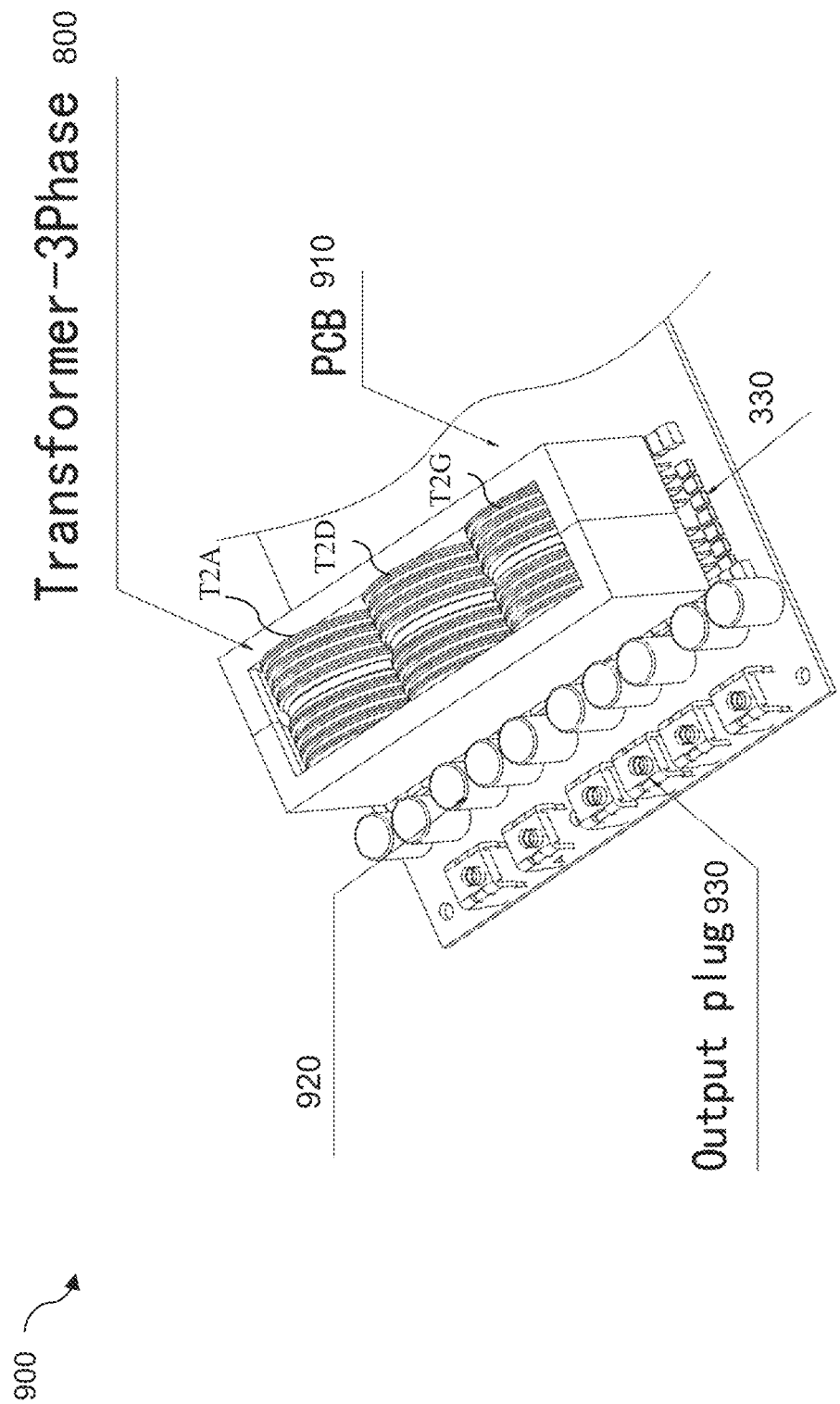
FIG. 9 is a schematic diagram of an example circuit in accordance with various embodiments of the present disclosure.

FIG. 9 is a schematic diagram of an example circuit 900 in a top perspective view in accordance with various embodiments of the present disclosure. The circuit 900 includes a PCB 910 and the three-phase integrated transformer 800 placed on the top layer of the PCB 910. The circuit 900 may be the power supply circuit as described above with respect to FIGS. 1-6. In FIG. 9, components similar to those described previously will be referred to using the same reference numbers as used previously. The three-phase integrated transformer 800 has three phases T2A, T2D and T2G. As described above, the circuit 900 may include synchronous rectifier groups and output filter capacitor groups associated with each phase of the transformer 800. FIG. 9 shows the eleventh synchronous rectifier group 330 as described with respect to FIG. 3D, and the fourteenth filter capacitor group (920). The fourteenth filter capacitor group 920 is placed outside and along the sidewall 820 of the transformer 800. FIG. 9 also shows multiple output plugs 930 placed on the top layer of the PCB 910.

Figure 10:
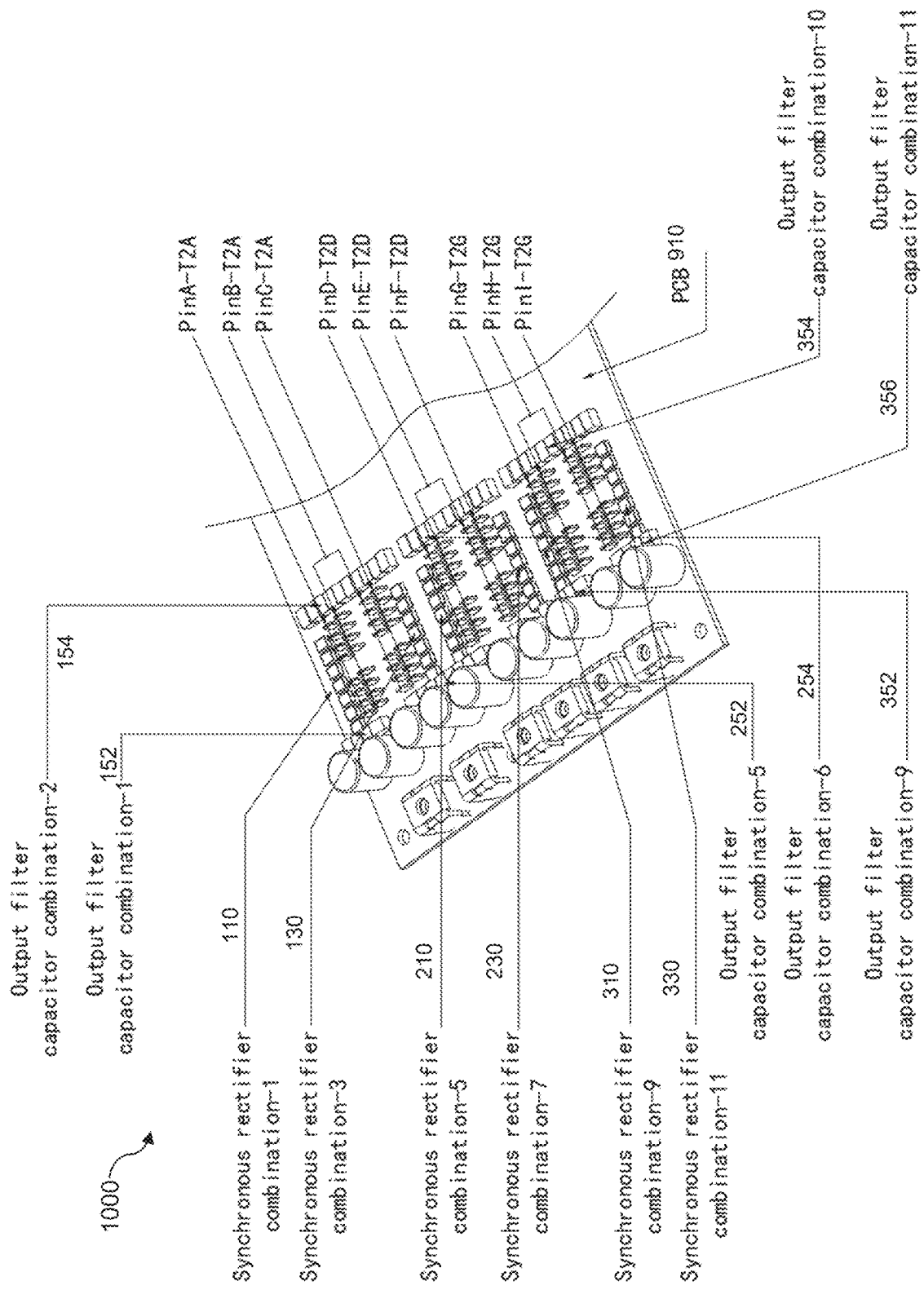
FIG. 10 is a schematic diagram showing a sectional view of the circuit in FIG. 9 in accordance with various embodiments of the present disclosure.

FIG. 10 is a schematic diagram showing a top view 1000 of the circuit 900 with portions of the transformer 800 removed in accordance with various embodiments of the present disclosure. As noted here, in FIG. 10 and FIG. 11, a synchronous rectifier group may also be referred to as a synchronous rectifier combination, and an output filer capacitor group may also be referred to as an output filer capacitor combination. As an example, the first synchronous rectifier group may be referred to as synchronous rectifier combination-1, and the first output filer capacitor group may be referred to as output filer capacitor combination-1. This is similarly applied to other synchronous rectifier groups and output filer capacitor groups. FIG. 10 shows the terminals of the three phases of the three-phase integrated transformer 800, i.e., PinA, PinB and PinC; PinD, PinE and PinF; and PinG, PinH and PinI on the top layer of the PCB 910. FIG. 10 also shows that on the top layer of the PCB 910, as described above, the first and third rectifier groups 110 and 130 are placed along first opposing sides of the first phase transformer T2A, and the first and second output filter capacitor groups 152 and 154 are placed along second opposing sides of the first phase transformer T2A. Similarly, the fifth and seventh rectifier groups 210 and 230 are placed along first opposing sides of the second phase transformer T2D, and the fifth and sixth output filter capacitor groups 252 and 254 are placed along second opposing sides of the second phase transformer T2D. The ninth and eleventh rectifier groups 310 and 330 are placed along first opposing sides of the third phase transformer T2G, and the nineth, tenth and eleventh output filter capacitor groups 352, 354 and 356 are placed along second opposing sides of the third phase transformer T2G.

FIG. 11 is a schematic diagram showing a bottom view 1100 of the circuit 900 in accordance with various embodiments of the present disclosure. FIG. 11 shows that on the bottom layer of the PCB 910, as described above, the second and fourth rectifier groups 120 and 140 are placed along the first opposing sides of the first phase transformer T2A, and the third and fourth output filter capacitor groups 156 and 158 are placed along the second opposing sides of the first phase transformer T2A. Similarly, the sixth and eighth rectifier groups 220 and 240 are placed along the first opposing sides of the second phase transformer T2D, and the seventh and eighth output filter capacitor groups 256 and 258 are placed along the second opposing sides of the second phase transformer T2D. The tenth and twelfth rectifier groups 320 and 340 are placed along the first opposing sides of the third phase transformer T2G, and the twelfth and thirteenth output filter capacitor groups 358 and 360 are placed along the second opposing sides of the third phase transformer T2G.

Figure 12:
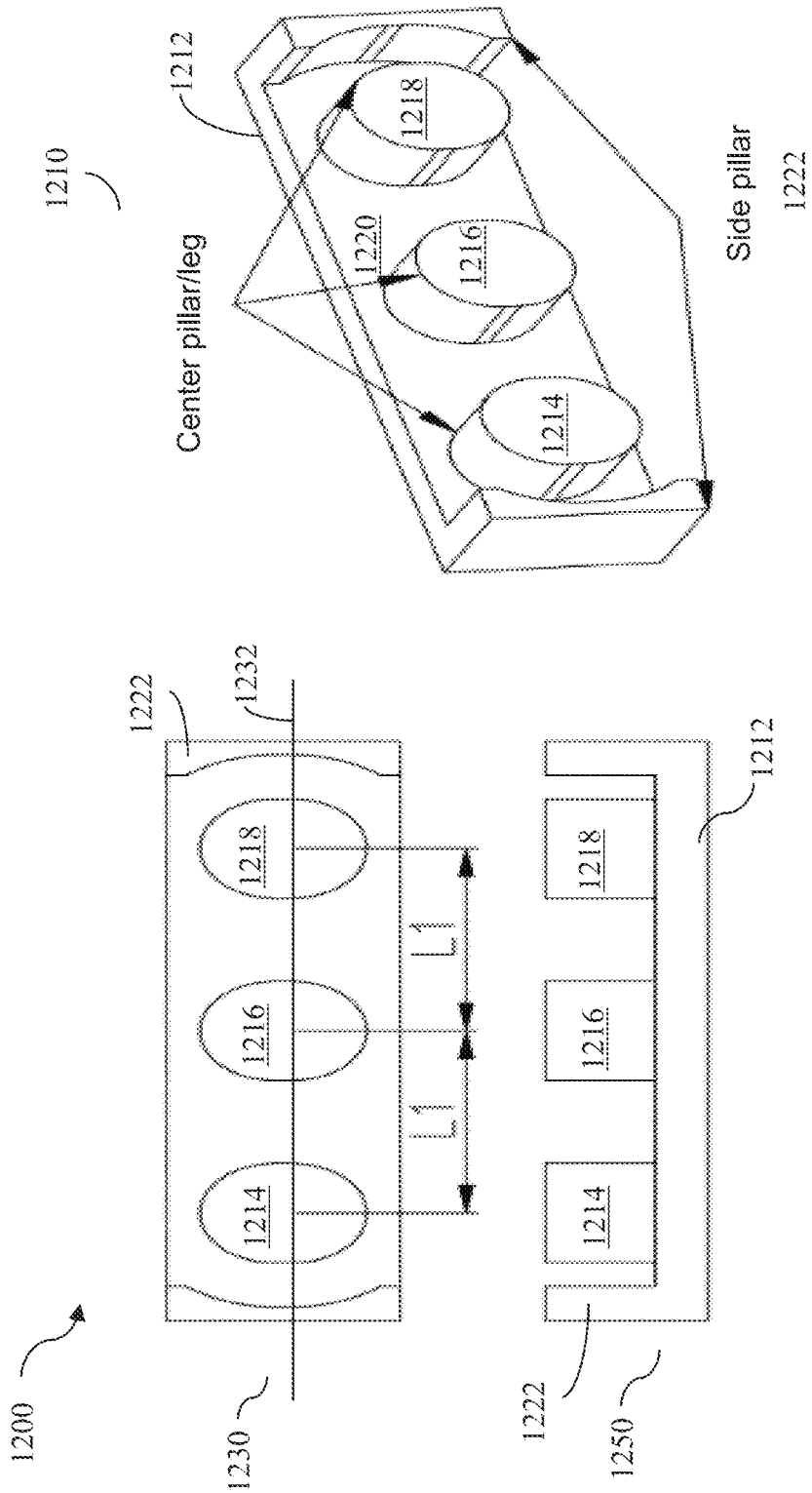
FIG. 12 is a schematic diagram illustrating an example magnetic core that may be used for a transformer in accordance with various embodiments of the present disclosure.

FIG. 12 is a diagram illustrating an example magnetic core 1200 of an integrated magnetics structure, including a perspective view 1210, a top view 1230, and a front view 1250 of the magnetic core 1200, in accordance with various embodiments of the present disclosure. The magnetic core 1200 includes a main body 1212, and three core center pillars (also referred to legs) 1214, 1216 and 1218 extending from the main body 1212. As an example, the three legs 1214, 1216 and 1218 extend from a surface 1220 of the main body 1212, in a direction perpendicular to the surface 1220. The cross sections of the three legs 1214, 1216 and 1218 may be in a shape of a circle, an oval, or other applicable shapes. This example shows a general oval shape, but a circle also applies, where the three legs 1214, 1216 and 1218 may have a shape of cylinder. The centers of the three legs 1214, 1216 and 1218 may be aligned along a horizontal line 1232 in a left-right direction of the magnetic core 1200. The horizontal line 1232 may be a center line of the magnetic core in the left-right direction or longitudinal direction of the core 1200. The three legs 1214, 1216 and 1218 may be evenly spaced at a distance L1 (also referred to as leg spacing or pillar spacing in the following). The main body 1212 may be in a U shape, and include two side pillars 1222 encompassing the three legs 1214, 1216 and 1218 in between.

The three legs 1214, 1216 and 1218 may be used to realize the windings of the transformer. In one embodiment, each leg may be used to realize the winding of one phase of the transformer, and thus, the transformer may have three phases. For example, the leg 1214 may form a first phase transformer, the leg 1216 may form a second phase transformer, and the leg 1218 may for a third phase transformer. Compared with a power conversion system having three separate transformers, the magnetic core 1200 with the structure as shown reduces the size of a transformer having three phases, thereby reducing the length of the magnetic circuit, lowering the magnetic loss and improving the efficiency of the transformer.

The magnetic core 1200 may be used as the cores 810 and 820 to form the three-phase integrated transformer 800. As an example, two cores 1200 may be arranged side by side or stacked, with the three legs of a first core 1200 facing toward the three legs of the second core 1200, respectively. The primary windings and secondary windings may be alternately arranged on the legs.

Figure 13:
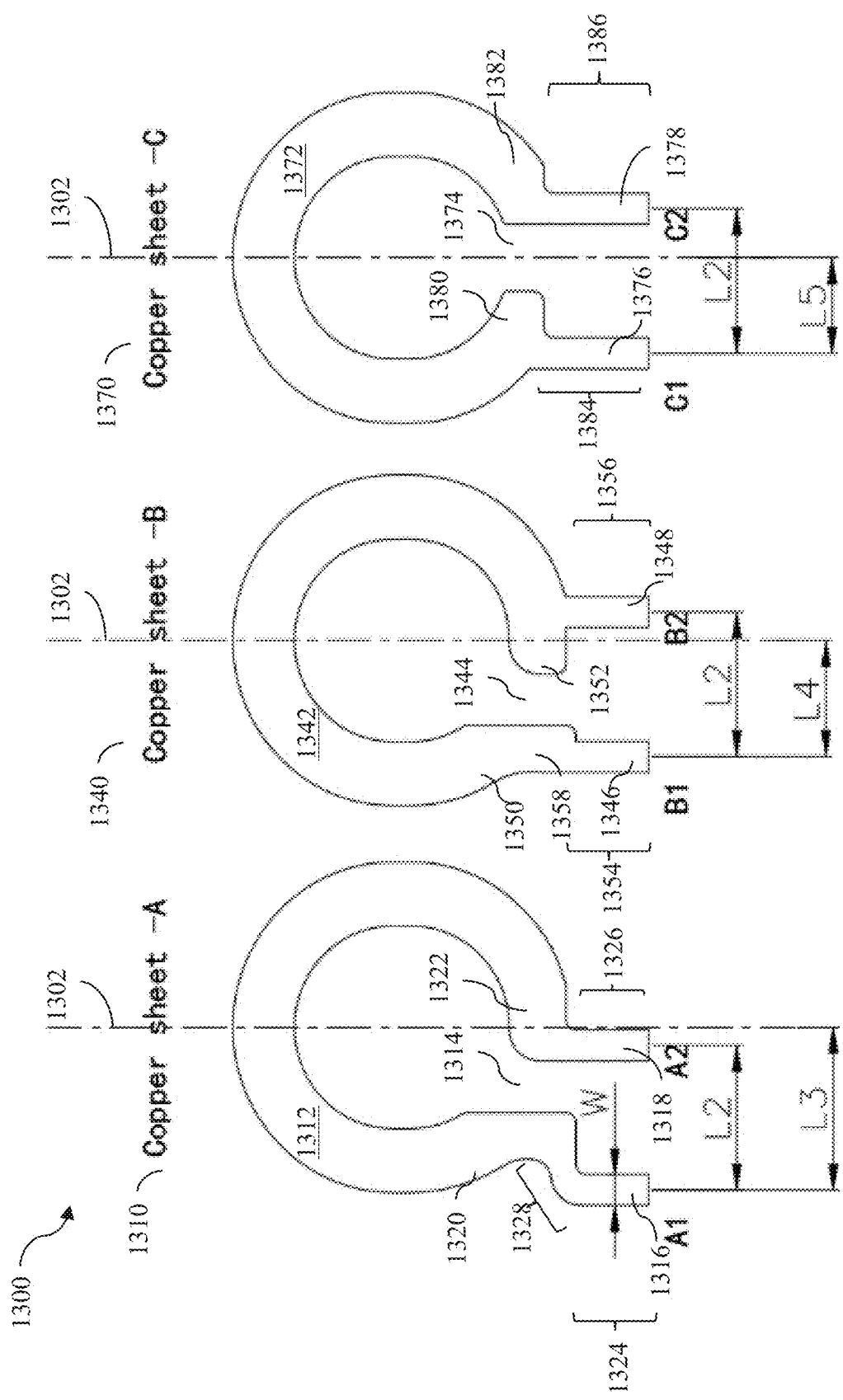
FIG. 13 is a schematic diagram illustrating example metal sheets of three different sheet types in accordance with various embodiments of the present disclosure.

In some embodiments, the secondary windings may be formed using metal sheets. FIG. 13 is a schematic diagram 1300 illustrating example metal sheets of three different sheet types in accordance with various embodiments of the present disclosure. The metal sheets may be used as the secondary windings of the core, and placed around the core legs. In some embodiments, the metal sheets may be made of copper, e.g., purple copper. In the following, a metal sheet made of copper is used as examples for illustration, and is referred to as a copper sheet. The metal sheets may have different sheet structures or sheet types. FIG. 13 illustrates example copper sheets of three different sheet types A, B and C, i.e., a copper sheet A 1310, a copper sheet B 1340, and a copper sheet C 1370.

The copper sheet A 1310 of the sheet type A has a main body 1312 in a ring shape with an opening 1314 on the lower portion of the main body 1312, and two terminals A1 1316 and A2 1318 extending respectively downward from two ends 1320 and 1322 of the opening 1314. The ring shape may also be referred to as a disc shape with a hole in the middle, or a donut shape. The terminals A1 1316 and A2 1318 extend along a centerline 1302 of the ring shape. The centerline 1302 may be viewed as a vertical centerline in this this example. When the copper sheet is placed around a leg of the core 1200, the centerline 1302 of the ring shape may be perpendicular to the line 1132 in FIG. 1, i.e., perpendicular to the longitudinal direction of the core 1200. Each of the terminals A1 1316 and A2 1318 has a portion at the end of the corresponding terminal, i.e., a portion 1324, or a portion 1326, that extends downward in parallel to the centerline 1302. The two portions 1324 and 1326 (also referred to as vertical portions as they extend downward vertically) of the two terminals A1 1316 and A2 1318 each has a width W. A distance between the two terminals A1 1316 and A2 1318 is L2, i.e., the distance from a center of the terminal A1 1316 to a center of the terminal A2 1318 in a lateral direction (perpendicular to the centerline 1302) of the terminals is L2. A distance from the terminal A1 1316 to the centerline 1302 of the ring shape is L3, i.e., the distance from the center of the terminal A1 1316 in the lateral direction to the centerline 1302 is L3. In this example, an edge of the terminal A2 1318 is aligned with the centerline 1302, and both the terminals A1 1316 and A2 1328 are at the one side of the centerline 1302.

The copper sheet B 1340 of the sheet type B has a main body 1342 in the ring shape with an opening 1344 on the lower portion of the main body 1342, and two terminals B1 1346 and B2 1348 extending respectively downward from two ends 1350 and 1352 of the opening 1344. The terminals B1 1346 and B2 1348 extend along the vertical centerline 1302 of the ring shape. Each of the terminals B1 1346 and B2 1348 has a portion at the end of the corresponding terminal, i.e., a portion 1354, or a portion 1356, that extends downward in parallel to the centerline 1302. The two portions 1354 and 1356 (also referred to as vertical portions) of the two terminals B1 1346 and B2 1348 each has a width W. A distance between the two terminals B1 1346 and B2 1348 is L2, i.e., the distance from a center of the terminal B1 1346 to a center of the terminal B2 1348 in a lateral direction of the terminals is L2. A distance from the terminal B1 1346 to the centerline 1302 of the ring shape is L4, i.e., the distance from the center of the terminal B1 1346 to the centerline 1302 in the lateral direction is L4. In this example, the two terminals B1 1346 and B2 1348 are located at two sides of the centerline 1302.

The copper sheet C 1370 of the sheet type C has a main body 1372 in the ring shape with an opening 1374 on the lower portion of the main body 1372, and two terminals C1 1376 and C2 1378 extending respectively downward from two ends 1380 and 1382 of the opening 1374. The terminals C1 1376 and C2 1378 extend along the vertical centerline 1302 of the ring shape. Each of the terminals C1 1376 and C2 1378 has a portion at the end of the corresponding terminal, i.e., a portion 1384, or a portion 1386, that extends downward in parallel to the centerline 1302. The two portions 1384 and 1386 (also referred to as vertical portions) of the two terminals C1 1376 and C2 1378 each has a width W. A distance between the two terminals C1 1376 and C2 1378 is L2, i.e., the distance from a center of the terminal C1 1376 to a center of the terminal C2 1378 in a lateral direction of the terminals is L2. A distance from the terminal C1 1376 to the centerline 1302 of the ring shape is L5, i.e., the distance from the center of the terminal C1 1376 to the centerline 1302 in the lateral direction is L5. L5, L4 and L3 are different from one another. In this example, the two terminals C1 1376 and C2 1378 are located at the two sides of the centerline 1302.

The distance between the two terminals of each of the copper sheets A 1310, B 1340 and C 1370 are the same, i.e., L2. All the terminals of the three copper sheets may have the same width, i.e., W. However, the respective first terminals (i.e., terminals 1316, 1346, and 1376) of the copper sheets A 1310, B 1340 and C 1370 have different distances to the centerline 1302, or the respective second terminals (i.e., terminals 1318, 1348, and 1378) of the copper sheets A 1310, B 1340 and C 1370 have different distances to the centerline 1302. The differences may be made by providing different openings 1314, 1344 and 1374 on the ring shape, e.g., different positions or sizes of the openings. A terminal may have a transition portion between an end of an opening and a vertical portion of the terminal, which may be present as a result of manufacturing in order to obtain the required positions of the terminal while keeping the distances L2, and L3, L4 or L5. As an example, the terminal 1316 may include a bent or arched transition portion 1328 connecting the end 1320 and the vertical portion 1324. The terminal 1318 may include a similar transition portion. As another example, the terminal 1346 may include a transition portion 1358 connecting the end 1350 and the vertical portion 1354, where the transition portion 1358 has a width greater than W. The two terminals of each of the copper sheets 1310, 1340 and 1370 are not symmetric around the centerline 1302.

As used herein, the term "ring" is used merely for description purposes to describe a general shape of the metal sheets. The cross section of the ring shape may have a shape of circles or ovals. The size of the ring shape (e.g., the hole in the middle of the ring shape, the diameters of the ring shapes) and the general shape of the ring shape need to match the core (e.g., the size of the core, the leg spacing, and so on) in order to place the metal sheets around the legs of the core. The three sheet types use the same ring shape (including size) but with different openings and terminals provided on the ring shape. L1-L5 and/or W of the sheet types may be collectively referred to as a set of sheet parameters of the sheet types.

According to some embodiments of the present disclosure, the sheet types A, B and C may be utilized to form windings and used as secondary windings for transformers. Taking the core 1200 having three legs as an example, the following three windings may be formed to place on the three legs, respectively. Those of ordinary skill in the art would recognize that various modifications, embodiments and alternations may be applicable to form the windings based on the core to be used and PCB layout requirements, without departing from the spirit and principle of the present disclosure.

In some embodiments, a first winding (e.g., a winding 1410 in FIG. 14 in the following) may include the copper sheet A 1310 and the copper sheet B 1340 that are stacked with the copper sheet A 1310 on top of the copper sheet B 1340. Specifically, a rear surface of the copper sheet A 1310 is disposed on top of a front surface of the copper sheet B 1340, i.e., the rear surface of the copper sheet A 1310 faces the front surface of the copper sheet B 1340. An insulating film may be disposed between the copper sheet A 1310 and the copper sheet B 1340.

In some embodiments, a second winding (e.g., a winding 1430 in FIG. 14 in the following) may include two copper sheets C 1370 (i.e., a first copper sheet C 1370 and a second copper sheet C 1370), where the two copper sheets C 1370 are stacked with the first copper sheet C 1370 on top of the second copper sheet C 1370 that is flipped (front-rear). Specifically, a rear surface of the first copper sheet C 1370 is disposed on top of a rear surface of the second copper sheet C 1370, i.e., the rear surface of the first copper sheet C 1370 faces the rear surface of the second copper sheet C 1370. An insulating film may be disposed between the two copper sheets C 1370.

In some embodiments, a third winding (e.g., a winding 1450 in FIG. 1 4 in the following) may include the copper sheet A 1310 and the copper sheet B 1340 that are flipped and stacked with the flipped copper sheet A 1310 on top of the flipped copper sheet B 1340. That is, both the copper sheet A 1310 and the copper sheet B 1340 are flipped by 180 degrees (front-rear), and the flipped copper sheet A 1310 is stacked on top of the flipped copper sheet B 1340. Specifically, the front surface of the copper sheet A 1310 is disposed on top of the rear surface of the copper sheet B 1340, i.e., the front surface of the copper sheet A 1310 faces the rear surface of the copper sheet B 1340. An insulating film may be disposed between the copper sheet A 1310 and the copper sheet B 1340. The embodiment first, second and third windings may be used as secondary windings of a transformer, e.g., the three-phase integrated transformer as descried above.

In some embodiments, based on PCB layout requirements, the core, and other possible requirements (collectively referred to as winding requirements thereafter), the parameters L1-L5 and/or W of the sheet types may be determined, and then copper sheets of the sheet types A, B and C may be made or selected based on the parameters. A certain set of winding requirements may correspond to a set of sheet parameters, such as L1-L5, W and other parameters. In one example, the width of the terminals W may be determined based on the core/leg size. Various sheet types may be designed and constructed based on various winding requirements, and used to form various windings, e.g., the above first, second and third windings.

Figure 14:
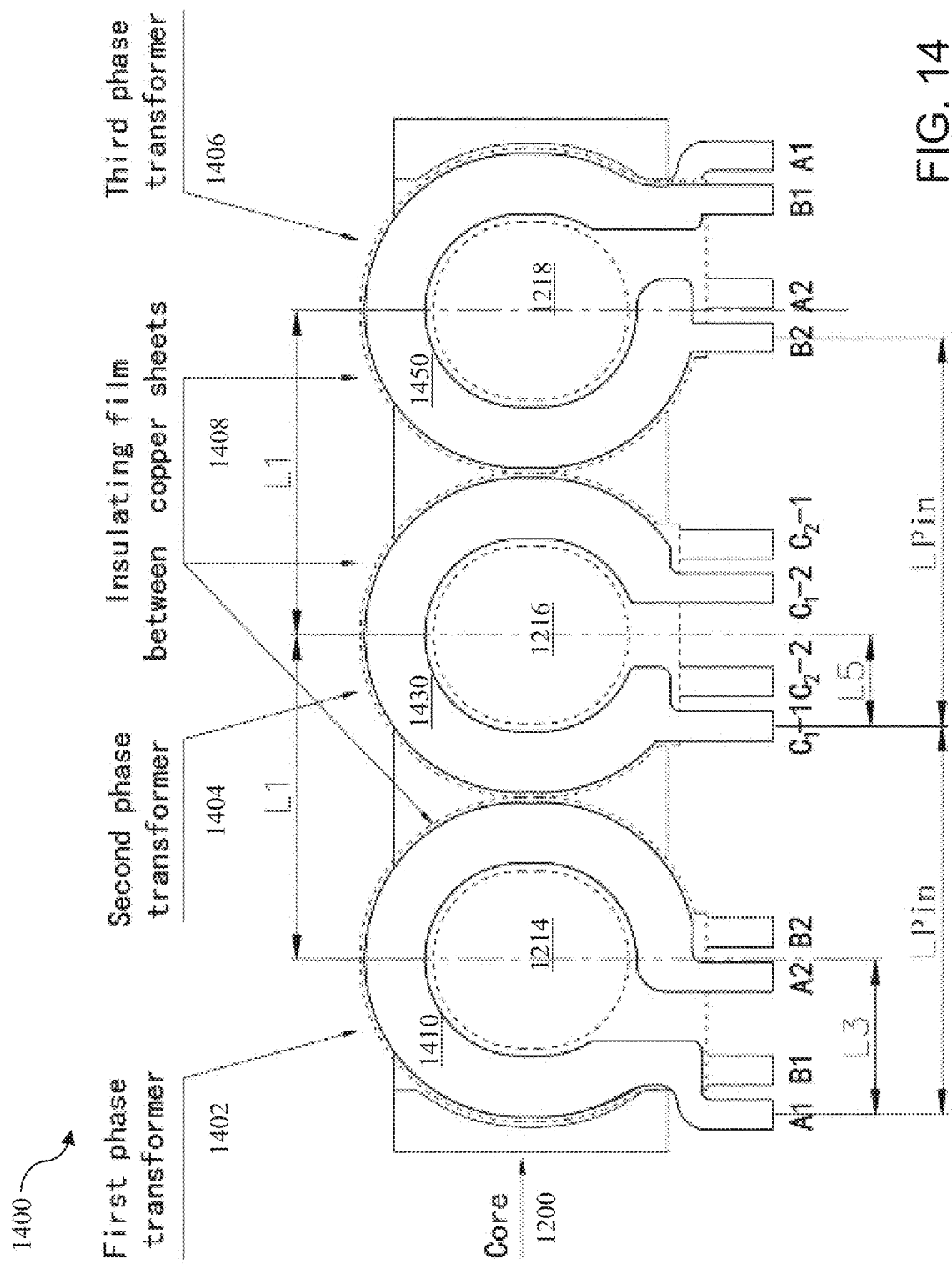
FIG. 14 is a schematic diagram of an example transformer structure in accordance with various embodiments of the present disclosure.

FIG. 14 is a diagram of a top view of an example transformer structure 1400 in accordance with various embodiments of the present disclosure. The transformer structure 1400 may be used to form the three-phase integrated transformer 800. The transformer structure 1400 includes a first phase transformer 1402, a second phase transformer 1404 and a third phase transformer 1406, which are formed using the core 1200 as described with respect to FIG. 12, where secondary windings are formed by using the above described three windings.

In this example, the first phase transformer 1402 includes the first winding (labeled herein with 1410) placed around the core leg 1214 of the core 1200. As described above, the first winding 1410 includes the copper sheet A 1310 having two terminals A1 and A2, and the copper sheet B 1340 having two terminals B1 and B2, where the copper sheet A 1310 is stacked on top of the copper sheet B 1340. An insulating film 1408 (dashed line) is placed between the copper sheet A 1310 and the copper sheet B 1340.

The second phase transformer 1404 includes the second winding (labelled herein with 1430) placed around the core leg 1216 of the core 1200. As described above, the second winding 1430 includes the first copper sheet C 1370 having two terminals (C1-1 and C1-2 in this example), and the second copper sheet C 1370 having two terminals (C2-1 and C2-2 in this example), where the second copper sheet C 1370 is flipped, and the first copper sheet C 1370 is stacked on top of the flipped second copper sheet C 1370. An insulating film 1408 is placed between the first copper sheet C 1370 and the flipped second copper sheet C 1370.

The third phase transformer 1406 includes the third winding (labeled herein with 1450) placed around the core leg 1218 of the core 1200. As described above, the third winding 1450 includes the copper sheet A 1310 having the two terminals A1 and A2, and the copper sheet B 1340 having the two terminals B1 and B2, where both the copper sheet A 1310 and the copper sheet B 1340 are flipped and stacked, with the flipped copper sheet A 1310 stacked on top of the flipped copper sheet B 1340. An insulating film 1408 is placed between the flipped copper sheet A 1310 and the flipped copper sheet B 1340.

In the transformer structure 1400, the leg spacing of the core 1200 is L1. Distances between the terminals A1 and A2, terminals B1 and B2, terminals C1-1 and C1-2, and terminals C2-1 and C2-2 are the same, which are L2. The winding spacing is LPin, which is the distance between the terminal A1 of the first winding 1410 and the terminal C1-1 of the second winding 1430, and the distance between the terminal C1-1 of the second winding 1430 and the terminal B2 of the third winding 1450. The terminals may be directly welded to a printed circuit board (PCB). The distance from the terminal A1 of the first winding 1410 to the centerline is L3, and the distance from the terminal C1-1 of the second winding 1430 to the centerline is L5. Therefore, it can be seen that $\Delta L=LPin-L1=L3-L5$, where $\Delta L$ is the difference between the winding spacing LPin and the leg spacing L1, which is also equal to the difference between L3 and L5. By changing $\Delta L$, i.e., the difference between L3 and L5, the winding spacing LPin can be adjusted, to satisfy different PCB layout requirements.

The insulating films 1408 may be in a shape similar to that of the ring shape of the copper sheets, and may have a larger surface than the ring shape for the convenience of being placed between two copper sheets.

The first phase transformer 1402 may be used as the first phase transformer T2A of the three-phase integrated transformer 800. The terminals A1 and B2 of the first phase transformer 1402 may be used respectively as the terminals A and C (PinA and PinC) of the first phase transformer T2A. The terminals B1 and A2 of the first phase transformer 1402 may be connected and used as the terminal B of the first phase transformer T2A of the three-phase integrated transformer 800.

The second phase transformer 1404 may be used as the second phase transformer T2D of the three-phase integrated transformer 800. The terminals C1-1 and C2-1 of the second phase transformer 1404 may be used respectively as the terminals D and F (PinD and PinF) of the second phase transformer T2D. The terminals C2-2 and C1-2 of the second phase transformer 1404 may be connected and used as the terminal E of the second phase transformer T2D of the three-phase integrated transformer 800.

The third phase transformer 1406 may be used as the third phase transformer T2G of the three-phase integrated transformer 800. The terminals B2 and A1 of the third phase transformer 1406 may be used respectively as the terminals G and I (PinG and PinI) of the third phase transformer T2G. The terminals A2 and B1 of the third phase transformer 1406 may be connected and used as the terminal H of the third phase transformer T2G of the three-phase integrated transformer 800.

Although the above embodiment layouts are illustrated with respect to a three-phase integrated transformer, the similar layouts may be applied to circuits with various transformers, e.g., a single phase transformer. For example, the layouts 170 and 180 may be applied to a single phase transformer. One or more features of the above described embodiments of the present disclosure may be combined, and one or more embodiments of the present disclosure may be combined, without departing from the spirit and scope of the disclosure. An embodiment including one or more features of any one of more of the above described embodiments of the present disclosure belongs to the scope of the present disclosure.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus comprising:
   a transformer on a top layer of a circuit board, the transformer including a first phase transformer;
   a first synchronous rectifier group and a third synchronous rectifier group placed respectively along first two opposite sides of the first phase transformer on the top layer of the circuit board;
   a second synchronous rectifier group and a fourth synchronous rectifier group placed respectively along the first two opposite sides of the first phase transformer on a bottom layer of the circuit board, each of the first, second, third and fourth synchronous rectifier groups comprising a plurality of power switches, the first and second synchronous rectifier groups being connected between a first terminal of the first phase transformer and a grounding terminal, and the third and fourth synchronous rectifier groups being connected between a second terminal of the first phase transformer and the grounding terminal;
   a first output filter capacitor group and a second output filter capacitor group placed respectively along second two opposite sides of the first phase transformer on the top layer of the circuit board; and
   a third output filter capacitor group and a fourth output filter capacitor group placed respectively along the second two opposite sides of the first phase transformer on the bottom layer of the circuit board, each of the first, second, third and fourth output filter capacitor groups comprising a plurality of capacitors, and being connected between a third terminal of the first phase transformer and sources of power switches of the of the first, second, third and fourth synchronous rectifier groups.

2. The apparatus of claim 1, wherein the second synchronous rectifier group is vertically aligned with the first synchronous rectifier group, and the fourth synchronous rectifier group is vertically aligned with the third synchronous rectifier group.

3. The apparatus of claim 1, wherein the third output filter capacitor group is vertically aligned with the first output filter capacitor group, and the fourth output filter capacitor group is vertically aligned with the second output filter capacitor group.

4. The apparatus of claim 1, wherein the first synchronous rectifier group occupies a portion of space along one side of the second two opposite sides of the first phase transformer.

5. The apparatus of claim 1, wherein a power switch of the plurality of power switches comprises a metal oxide semiconductor field-effect transistor (MOSFET) device, a bipolar junction transistor (BJT) device, a super junction transistor (SJT) device, an insulated gate bipolar transistor (IGBT) device, or a gallium nitride (GaN) based power device.

6. The apparatus of claim 1, wherein the circuit board is a printed circuit board (PCB).

7. The apparatus of claim 1, wherein:
   the first terminal of the first phase transformer is connected to drains of the plurality of power switches of the first synchronous rectifier group and the second synchronous rectifier group;

the second terminal of the first phase transformer is connected to drains of the plurality of power switches of the third synchronous rectifier group and the fourth synchronous rectifier group; and the third terminal of the first phase transformer is connected to a power output.

8. The apparatus of claim 1, wherein the transformer further comprises a second phase transformer, and the apparatus further comprises:
 a fifth synchronous rectifier group and a seventh synchronous rectifier group placed respectively along first two opposite sides of the second phase transformer on the top layer of the circuit board;
 a sixth synchronous rectifier group and an eighth synchronous rectifier group placed respectively along the first two opposite sides of the second phase transformer on the bottom layer of the circuit board, each of the fifth, sixth, seventh and eighth synchronous rectifier groups comprising a plurality of power switches, the fifth and sixth synchronous rectifier groups being connected between a first terminal of the second phase transformer and the grounding terminal, and the seventh and eighth synchronous rectifier groups being connected between a second terminal of the second phase transformer and the grounding terminal;
 a fifth output filter capacitor group and a sixth output filter capacitor group placed respectively along second two opposite sides of the second phase transformer on the top layer of the circuit board; and
 a seventh output filter capacitor group and an eighth output filter capacitor group placed respectively along the second two opposite sides of the second phase transformer on the bottom layer of the circuit board, each of the fifth, sixth, seventh and eighth output filter capacitor groups comprising a plurality of capacitors, and being connected between a third terminal of the second phase transformer and sources of power switches of the of the fifth, sixth, seventh and eighth synchronous rectifier groups.

9. The apparatus of claim 8, wherein the seventh output filter capacitor group is vertically aligned with the fifth output filter capacitor group, and the eighth output filter capacitor group is vertically aligned with the sixth output filter capacitor group.

10. The apparatus of claim 8, wherein the sixth synchronous rectifier group is vertically aligned with the fifth synchronous rectifier group, and the eighth synchronous rectifier group is vertically aligned with the seventh synchronous rectifier group.

11. The apparatus of claim 8, wherein:
 the first terminal of the second phase transformer is connected to drains of the plurality of switches of the fifth synchronous rectifier group and the sixth synchronous rectifier group;
 the second terminal of the second phase transformer is connected to drains of the plurality of switches of the seventh synchronous rectifier group and the eighth synchronous rectifier group; and
 the third terminal of the second phase transformer is connected to a power output.

12. The apparatus of claim 8, wherein the transformer further comprises a third phase transformer, and the apparatus further comprises:
 a nineth synchronous rectifier group and an eleventh synchronous rectifier group placed respectively along first two opposite sides of the third phase transformer on the top layer of the circuit board;
 a tenth synchronous rectifier group and a twelfth synchronous rectifier group placed respectively along the first two opposite sides of the third phase transformer on the bottom layer of the circuit board, each of the nineth, tenth, eleventh and twelfth synchronous rectifier groups comprising a plurality of power switches, the nineth and tenth synchronous rectifier groups being connected between a first terminal of the third phase transformer and the grounding terminal, and the eleventh and twelfth synchronous rectifier groups being connected between a second terminal of the third phase transformer and the grounding terminal;
 a nineth output filter capacitor group and a tenth output filter capacitor group placed respectively along second two opposite sides of the third phase transformer on the top layer of the circuit board;
 an eleventh output filter capacitor group placed on a same side as the nineth output filter capacitor group; and
 a twelfth output filter capacitor group and a thirteenth output filter capacitor group placed respectively along the second two opposite sides of the third phase transformer on the bottom layer of the circuit board, each of the nineth, tenth, eleventh, twelfth and thirteenth output filter capacitor groups comprising a plurality of capacitors, and being connected between a third terminal of the third phase transformer and sources of power switches of the nineth, tenth, eleventh, twelfth and thirteenth synchronous rectifier groups.

13. The apparatus of claim 12, wherein:
 the first terminal of the third phase transformer is connected to drains of the plurality of switches of the ninth synchronous rectifier group and the tenth synchronous rectifier group;
 the second terminal of the third phase transformer is connected to drains of the plurality of switches of the eleventh synchronous rectifier group and the twelfth synchronous rectifier group; and
 the third terminal of the third phase transformer is connected to a power output.

14. The apparatus of claim 1, further comprising:
 a fourteenth filter capacitor group placed along and outside a sidewall of the transformer on the top layer of the circuit board, the fourteenth filter capacitor group comprising:
  a first group of filter capacitors connected between the third terminal of the first phase transformer and the grounding terminal;
  a second group of filter capacitors connected between the third terminal of the second phase transformer and the grounding terminal; and
  a third group of filter capacitors connected between the third terminal of the third phase transformer and the grounding terminal.

15. A circuit comprising:
 a transformer on a top layer of a circuit board;
 a first synchronous rectifier group and a third synchronous rectifier group placed respectively along first two opposite sides of the transformer on the top layer of the circuit board;
 a second synchronous rectifier group and a fourth synchronous rectifier group placed respectively along the first two opposite sides of the transformer on a bottom layer of the circuit board, each of the first, second, third and fourth synchronous rectifier groups comprising a plurality of power switches, the first and second synchronous rectifier groups being connected between a first terminal of the transformer and a grounding terminal, and the third and fourth synchronous rectifier groups being connected between a second terminal of the transformer and the grounding terminal;
a first output filter capacitor group and a second output filter capacitor group placed respectively along second two opposite sides of the transformer on the top layer of the circuit board; and
a third output filter capacitor group and a fourth output filter capacitor group placed respectively along the second two opposite sides of the transformer on the bottom layer of the circuit board, each of the first, second, third and fourth output filter capacitor groups comprising a plurality of capacitors, and being connected between a third terminal of the transformer and sources of power switches of the of the first, second, third and fourth synchronous rectifier groups.

16. The circuit of claim 15, wherein the second synchronous rectifier group is vertically aligned with the first synchronous rectifier group, and the fourth synchronous rectifier group is vertically aligned with the third synchronous rectifier group.

17. The circuit of claim 15, wherein the third output filter capacitor group is vertically aligned with the first output filter capacitor group, and the fourth output filter capacitor group is vertically aligned with the second output filter capacitor group.

18. The circuit of claim 15, wherein:
drains of the plurality of power switches of the first synchronous rectifier group and the second synchronous rectifier group are connected to the first terminal of the transformer;
drains of the plurality of power switches of the third synchronous rectifier group and the fourth synchronous rectifier group are connected to the second terminal of the transformer;
sources of the plurality of power switches of the first, second, third and fourth synchronous rectifier group are connected to the grounding terminal; and
the third terminal of the transformer is connected to a power output.

19. The circuit of claim 15, further comprising:
a group of filter capacitors placed along and outside a sidewall of the transformer on the top layer of the circuit board, the group of filter capacitors being connected between the third terminal of the transformer and the grounding terminal.

20. An apparatus comprising:
a three-phase integrated transformer on a top layer of a printed circuit board (PCB), the transformer including a first phase transformer, a second phase transformer and a third phase transformer; and
for a transformer in the first phase transformer, the second phase transformer and the third phase transformer:
a first synchronous rectifier group and a third synchronous rectifier group placed respectively along first two opposite sides of the transformer on the top layer of the PCB;
a second synchronous rectifier group and a fourth synchronous rectifier group placed respectively along the first two opposite sides of the transformer on a bottom layer of the PCB, each of the first, second, third and fourth synchronous rectifier groups comprising a plurality of power switches, the plurality of power switches of the first and second synchronous rectifier groups being connected between a first terminal of the transformer and a grounding terminal, and the plurality of power switches of the third and fourth synchronous rectifier groups being connected between a second terminal of the transformer and the grounding terminal;
a first output filter capacitor group and a second output filter capacitor group placed respectively along second two opposite sides of the transformer on the top layer of the circuit board;
a third output filter capacitor group and a fourth output filter capacitor group placed respectively along the second two opposite sides of the transformer on the bottom layer of the circuit board, each of the first, second, third and fourth output filter capacitor groups comprising a plurality of capacitors connected between a third terminal of the transformer and sources of power switches of the of the first, second, third and fourth synchronous rectifier groups; and
a group of filter capacitors placed along and outside a sidewall of the three-phase integrated transformer on the top layer of the PCB, the group of filter capacitors being connected between the third terminal of the transformer and the grounding terminal.

* * * * *